US010410440B2

(12) United States Patent
Remboski et al.

(10) Patent No.: US 10,410,440 B2
(45) Date of Patent: Sep. 10, 2019

(54) DISTRIBUTED SYSTEM AND METHOD FOR MONITORING VEHICLE OPERATION

(71) Applicant: Traffilog Ltd., Rosh Haayin (IL)

(72) Inventors: Donald James Remboski, Ann Arbor, MI (US); Jacqueline A. Dedo, Wolverine Lake, MI (US); Dani Shafriri, Rosh-Haayin (IL); Asi Biton, Rosh-Haayin (IL); Arik Greenberger, Rosh-Haayin (IL)

( * ) Notice: Subject to any disclaimer, the term of this patent is extended or adjusted under 35 U.S.C. 154(b) by 0 days.

(21) Appl. No.: 15/836,970

(22) Filed: Dec. 11, 2017

(65) Prior Publication Data

US 2018/0268624 A1    Sep. 20, 2018

Related U.S. Application Data

(60) Provisional application No. 62/431,906, filed on Dec. 9, 2016, provisional application No. 62/431,919, filed on Dec. 9, 2016.

(51) Int. Cl.
*G07C 5/08* (2006.01)
*B60W 50/04* (2006.01)
(Continued)

(52) U.S. Cl.
CPC ....... *G07C 5/0808* (2013.01); *B60W 50/0097* (2013.01); *B60W 50/0205* (2013.01); *B60W 50/045* (2013.01); *B60W 50/14* (2013.01); *H04L 67/125* (2013.01); *B60W 2050/0077* (2013.01); *B60W 2050/0088* (2013.01); *B60W 2050/0089* (2013.01); *B60W 2050/021* (2013.01); *B60W 2050/046* (2013.01); *G06N 20/00* (2019.01); *G07C 5/008* (2013.01); *G07C 5/085* (2013.01)

(58) Field of Classification Search
USPC ................................. 701/41, 36, 2, 102, 469
See application file for complete search history.

(56) References Cited

U.S. PATENT DOCUMENTS 9,512,793 B2 * 12/2016 Toner ...................... F01N 3/101
2001/0027363 A1 * 10/2001 Shimazaki ............... B60R 1/00
701/41

(Continued)

*Primary Examiner* — Masud Ahmed
(74) *Attorney, Agent, or Firm* — Reches Patents

(57) ABSTRACT

A distributed system for monitoring and control of a vehicle having a plurality of physical systems, and a plurality of subsystems includes a supervisory controller with a first computer readable storage media for monitoring and storing a plurality of operational parameters. The supervisory controller communicates with a server a communications networks. A first method includes storing historical data in a database; simulating the physical system within the vehicle using a functional model; and continuously improving the model. Specific implementations of the first method include the physical system being a hydraulic system, an internal combustion engine, and a battery module. A second method includes storing historical data in a database; estimating a transfer function characterizing the behavior of a physical system; and diagnosing a subsystem as having a failure or a degradation. A third method includes monitoring operation actions related to safety, productivity, and efficiency. A fifth method includes operator training.

22 Claims, 16 Drawing Sheets

(51) Int. Cl.
*B60W 50/14* (2012.01)
*B60W 50/00* (2006.01)
*B60W 50/02* (2012.01)
*H04L 29/08* (2006.01)
G06N 20/00 (2019.01)
G07C 5/00 (2006.01)

(56) References Cited

U.S. PATENT DOCUMENTS

| | | | |
|---|---|---|---|
| 2001/0040505 A1* | 11/2001 | Ishida | G01C 21/3697 340/435 |
| 2004/0039527 A1* | 2/2004 | McDonald, Jr. | G01S 5/0027 701/469 |
| 2011/0202253 A1* | 8/2011 | Perry | B01D 53/9477 701/102 |
| 2011/0297460 A1* | 12/2011 | Chess | B62D 11/08 180/6.66 |
| 2012/0232749 A1* | 9/2012 | Schoenberg | B60N 2/002 701/36 |
| 2013/0338855 A1* | 12/2013 | Mason | G07C 5/0816 701/2 |
| 2014/0118551 A1* | 5/2014 | Ikeda | B60R 1/00 348/148 |
| 2016/0187487 A1* | 6/2016 | Itoh | G01S 17/89 356/4.01 |

* cited by examiner

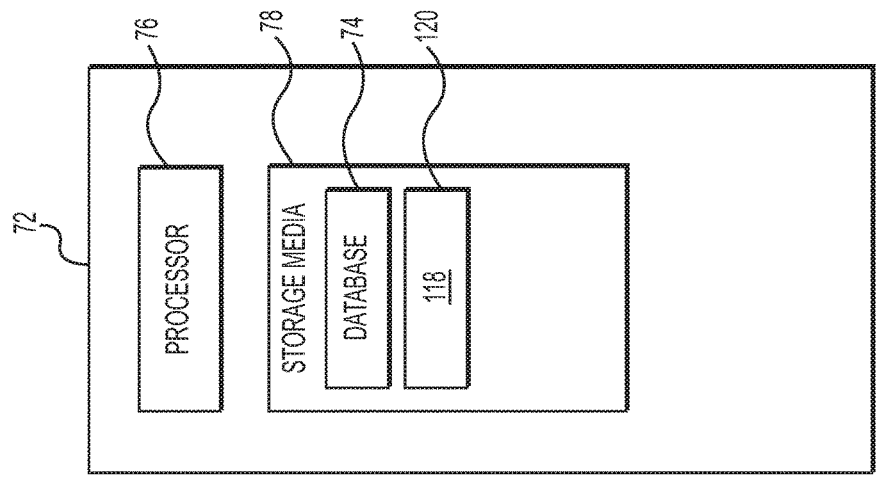
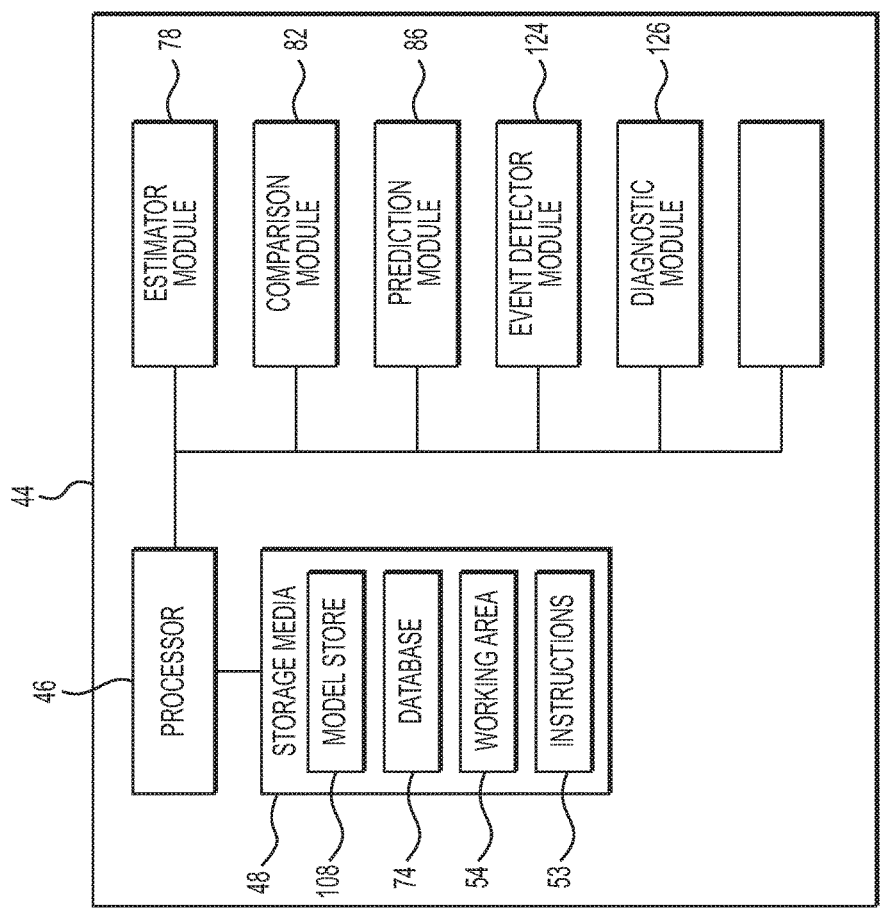
FIG. 3B
FIG. 3A

DISTRIBUTED SYSTEM AND METHOD FOR MONITORING VEHICLE OPERATION

CROSS REFERENCE TO RELATED APPLICATION

Utility Patent Application claims the benefit of U.S. Provisional Patent Application Ser. Nos. 62/431,919 and 62/431,906 both filed Dec. 9, 2016—both are hereby incorporated by reference in its entirety.

BACKGROUND OF THE INVENTION

1. Field of the Invention

A system and method for distributed monitoring and control of physical systems within a vehicle is provided.

2. Description of the Prior Art

Several different systems and methods for distributed monitoring of operator actions and the operation of physical systems within a vehicle exist today.

A goal of owners and operators of vehicles including hydraulic systems, internal combustion engines, and battery modules are to improve the reliability and useful life of those physical systems. Hydraulic system remaining useful life, oil and filter maintenance and overhaul intervals are typically calculated using measurements of machine hours of operation or calendar time in service. Hydraulic system use optimization is not usually done. Likewise, engine remaining useful life, oil condition based maintenance and coolant maintenance are typically calculated using measurements of engine hours of operation or engine fuel consumed. Engine use optimization is typically controlled entirely by the machine operator. Battery charge state is usually shown by open-circuit voltage measurement of the battery. Battery water level is monitored by periodic inspections. Battery remaining useful life is generally unknown or estimated roughly by the battery's time in service. Battery usage is rarely optimized based on battery state.

It is a goal of the present disclosure to improve the reliability and useful life of hydraulic systems in on-highway vocational equipment or off highway heavy equipment such as forklifts, articulating booms, teleboom handlers and reach stackers by accurately monitoring operational parameters of such hydraulic systems, and by optimizing hydraulic system use for fuel efficiency and hydraulic system life responsive to those monitored operational parameters. It is another goal of the present disclosure to improve the reliability and useful life of internal combustion engines in a similar manner. It is another goal of the present disclosure to improve the reliability and useful life of battery units in such vehicles.

Vehicles with complex electric, electronic, hydraulic or pneumatic controls and actuators can be difficult to diagnose when problems arise. Forming a pre-failure prediction of failures (prognostic) is similarly difficult. Many existing vehicles include embedded, computerized systems to observe and diagnose machine problems. These systems are typically static and not upgraded over time. These systems do not have automatic access to performance of similar machines for comparison purposes. In current solutions, monitoring systems are typically configured at the time a machine is built and are often not upgraded as more is learned about the machine's strengths and weaknesses. When the vehicle's configuration is changed in the field, the as-configured monitoring system that came with the vehicle becomes outdated. Current solutions often lack in accuracy and do not include a mechanism for continuous performance improvement. It is therefore a goal of the present disclosure to form accurate diagnostic and prognostic indicators of failures and degradations indicative of impending failures.

Safety, machine wear, productivity and energy efficiency are long-standing areas of improvement for on-highway and off-highway vehicle operators. Operators are currently measured using supervisor feedback, accident reports or machine abuse records that, by the nature of how they are collected are incomplete, subjective and imprecise. In many cases, productivity and fuel efficiency are not measured or measured using imprecise methods. This incompleteness and imprecision leads to less than optimal improvement training and coaching for operators. This, in turn, decreases safety and increases costs. It is therefore a goal of the present disclosure to facilitate improvement in operator performance and in overall enterprise performance in the areas of machine wear, productivity and energy efficiency.

Training of vehicle operators is typically conducted in a classroom or computer based instruction setting followed by in-machine training with an instructor. The current solution requires access to the vehicle of interest and to an instructor. The current solution does not observe or correct operator errors after the training period is completed. A need exists for In-vehicle, active training, which can augment and in some cases reduce or replace traditional training methods.

SUMMARY OF THE INVENTION

The invention provides for a distributed system for monitoring a vehicle. The distributed system includes a plurality of physical systems within the vehicle. Each of the physical systems has a plurality of components. For example, as shown in FIG. 2, a physical system that is a hydraulic system may have components that include a hydraulic pump, a valve manifold, and several different hydraulic motors for moving different parts of the vehicle. The distributed system also includes a plurality of sensors, each measuring one or more physical properties on the vehicle; and a plurality of subsystems within the vehicle, such as, for example, a coolant circulation loop or a charge air system providing fresh air to the engine, or a compressor loop of an air conditioning system.

The distributed system also includes a control module providing a command signal to an actuator. As shown in FIGS. 1-2, the distributed system includes a supervisory controller located in the vehicle and including a first processor and a first computer readable storage media. The supervisory controller is in communication with the sensors and the actuators and with a user signaling device.

As shown in FIG. 4, the first computer readable storage media of the supervisory controller includes a working area of memory holding a plurality of operational parameters, each having an associated numeric value, and each associated with the status of the vehicle.

As shown in FIG. 1, the distributed system includes a server located remotely from the vehicle and including a second processor and a second computer readable storage media and is in regular communications with the supervisory controller. The server 56 is also in regular communications with a plurality of other vehicles, each including at least one system similar or identical to one of the physical systems. A communications module, such as a Wi-Fi radio or a cellular data modem, is in communication with the supervisory controller for communicating with the server via a first external network and using a first communications channel.

A database is located in at least one of the first computer readable storage media or the second computer readable storage media of the server, and stores historical data including values of the plurality of operational parameters from different times.

As shown in FIG. 3A, an estimator module is configured to estimate a transfer function based upon the historical data. The transfer function characterizing the response in relation to a function input, which is an operational parameter. A comparison module is configured to compare the transfer function of the subsystem against a plurality of reference functions corresponding to subsystems having known good, bad, or degraded conditions, and for characterizing the subsystem relative to those subsystems having known good, bad, or degraded conditions.

A first method for monitoring of a vehicle includes monitoring by a supervisory controller located in the vehicle, values of a plurality of operational parameters related to a physical system of the vehicle. The first method also includes recording by a first processor of the supervisory controller, the values of the plurality of operational parameters in a working area of a first computer readable storage media of the supervisory controller.

The first method also includes storing historical data in a database located in at least one of the first computer readable storage media or a second computer readable storage media of a server located remotely from the vehicle, with the historical data including the values of the plurality of operational parameters recorded at different times.

The first method also includes providing a functional model 98 simulate the physical system within the vehicle, including a model parameter and a plurality of operational parameters, and a model formula for calculating a computed state value using the model parameter and the plurality of operational parameters.

The first method also includes storing the model parameter and the model formula in a model store area of memory within the first computer readable storage media of the supervisory controller. The first method also includes computing a computed state value of the physical system by at least one of the supervisory controller or the server, using the model formula and the model parameter and at least one of the operational parameters of the physical system.

The first method also includes improving at least one of the model formula or the value of the model parameter by comparing the computed state value to a measured value of an operational parameter associated therewith, and by adjusting at least one of the model formula or the value of the model parameter such that the computed state value of the physical system more accurately matches the measured value of the operational parameter associated therewith.

A second method for monitoring of a vehicle is also provided. The second method includes monitoring by a supervisory controller located in the vehicle, values of a plurality of operational parameters related to a subsystem of the vehicle. The second method also includes recording by a first processor of the supervisory controller, the values of the plurality of operational parameters in a working area of a first computer readable storage media of the supervisory controller.

The second method also includes storing historical data in a database located in at least one of the first computer readable storage media or a second computer readable storage media of a server located remotely from the vehicle, with the historical data including the values of the plurality of operational parameters recorded at different times.

The second method also includes estimating by an estimator module a transfer function based upon the historical data and characterizing the response in relation to the function input. A transfer function may relate, for example, the time between a control action by an operator and a response resulting from a control system and actuator on the vehicle. The function input may be any operational parameter such as a feedback signal from one of the sensors or a command signal from a control module. The function input may also be calculated value based on several different operational parameters.

The second method also includes diagnosing the subsystem by a diagnostic module as having a failure or a degradation associated therewith by comparing by a comparison module the transfer function of the subsystem against a plurality of reference functions corresponding to subsystems having known good, bad, or degraded conditions. The second method also includes notifying interested parties of a subsystem having a failure or a degradation associated therewith.

A third method for monitoring of a vehicle is also provided. The third method includes monitoring by a supervisory controller located in the vehicle, values of a plurality of operational parameters related to a physical system of the vehicle. The operational parameters include control inputs by an operator of the vehicle. The third method also includes recording by a first processor of the supervisory controller, the values of the plurality of operational parameters in a working area of a first computer readable storage media of the supervisory controller.

The third method also includes storing historical data in a database located in at least one of the first computer readable storage media or in a second computer readable storage media of a server located remotely from the vehicle, with the historical data including the values of the plurality of operational parameters recorded at different times. The third method also includes providing a functional model to simulate the physical system within the vehicle, including a model parameter and a plurality of operational parameters, and a model formula for calculating a computed state value using the model parameter and the plurality of operational parameters.

The third method also includes storing the model parameter and the model formula in a model store area of memory within a first computer readable storage media of the supervisory controller located in the vehicle. The third method also includes characterizing, using the functional model, a control input by the operator of the vehicle as being associated with at least one of a safety-related outcome, a productivity outcome, an energy efficiency outcome, or excessive wear of a component of the vehicle. The third method proceeds with notifying at least one of the operator of the vehicle or a supervisor substantially immediately after detection of a control input characterized as being associated with an unsafe condition, low productivity, low energy efficiency, or excessive wear of a component of the vehicle.

A fourth method for training a trainee to operate a vehicle is also provided. The fourth method includes monitoring by a supervisory controller located on the vehicle, values of a plurality of operational parameters related to a physical system of the vehicle. The operational parameters include control inputs to the vehicle by the trainee such as, for example, throttle, brake, and steering positions.

The fourth method also includes recording by a first processor of the supervisory controller, the values of the plurality of operational parameters in a working area of a first computer readable storage media of the supervisory controller, with a subset of the plurality of operational parameters being designated as associated operational parameters which are associated with a maneuver of the vehicle. The fourth method also includes transmitting by the supervisory controller, the values of the associated operational parameters to a server located remotely from the vehicle using a first communications channel.

The fourth method also includes providing a user interface device for providing directions to the trainee while operating the vehicle. The fourth method includes transmitting by the server, a training instruction including directions on performing a maneuver of the vehicle using the control inputs, to the user interface device using a second communications channel. The fourth method includes providing the training instruction to the trainee by the user interface device.

The fourth method includes determining, by the server, a successful completion of training instruction by at least one of the supervisory controller or the server, by comparing the associated operational parameters to a predetermined passing criterion.

The fourth method also includes providing a subsequent training instruction to the trainee after the successful completion of the training instruction.

The fourth method also includes determining, by the server, an unsuccessful attempt to complete the training instruction by the supervisory controller by comparing the associated operational parameters to an instruction failure criteria, and wherein the instruction failure criteria includes the passage of a timeout period of time after providing the training instruction and without successful completion of the training instruction.

The fourth method also includes concluding the training with a passing grade after successful completion of a training program including a plurality of the training instructions. The fourth method also includes concluding the training with a failing grade in response to the occurrence of a training failure criterion.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3A is a block diagram of a supervisory controller of the distributed system for monitoring vehicle operation;

FIG. 3B is a block diagram of a server of the distributed system for monitoring vehicle operation;

DESCRIPTION OF THE ENABLING EMBODIMENT

Referring to the Figures, wherein like numerals indicate corresponding parts throughout the several views, a distributed system 20 for monitoring a vehicle 22 is provided. The vehicle 22 may be an on-road conveyance, such as a car or truck. The vehicle 22 may be a conveyance or machine intended for off-road use. The vehicle 22 may be a piece of heavy equipment such as, for example, a bulldozer, forklift, articulating boom, teleboom handler, reach stacker, excavator, or a crane. The vehicle 22 may be designed and used for indoor or outdoor use.

Figure 1:
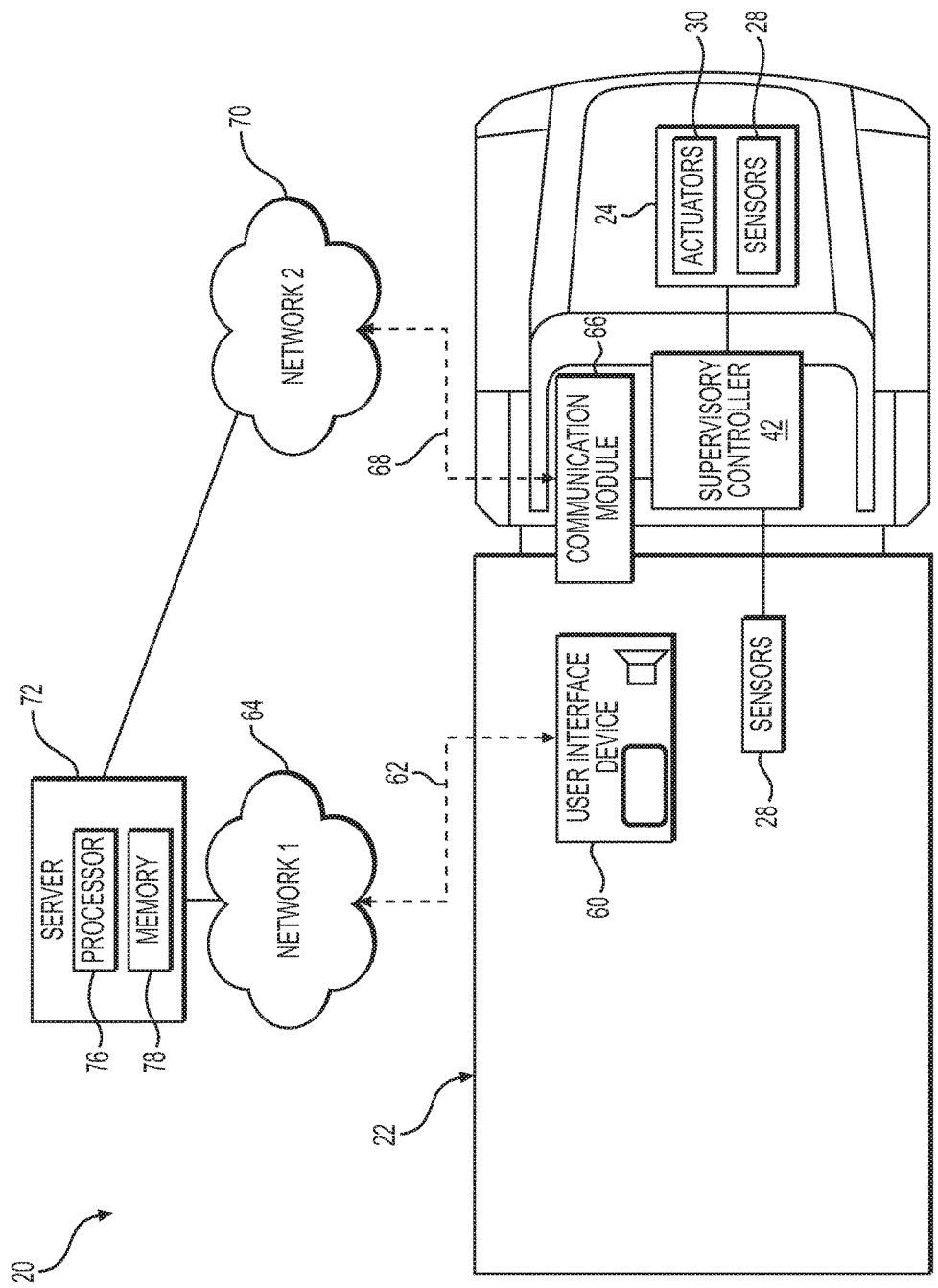
FIG. 1 is a block diagram of a distributed system for monitoring vehicle operation.
Figure 2:
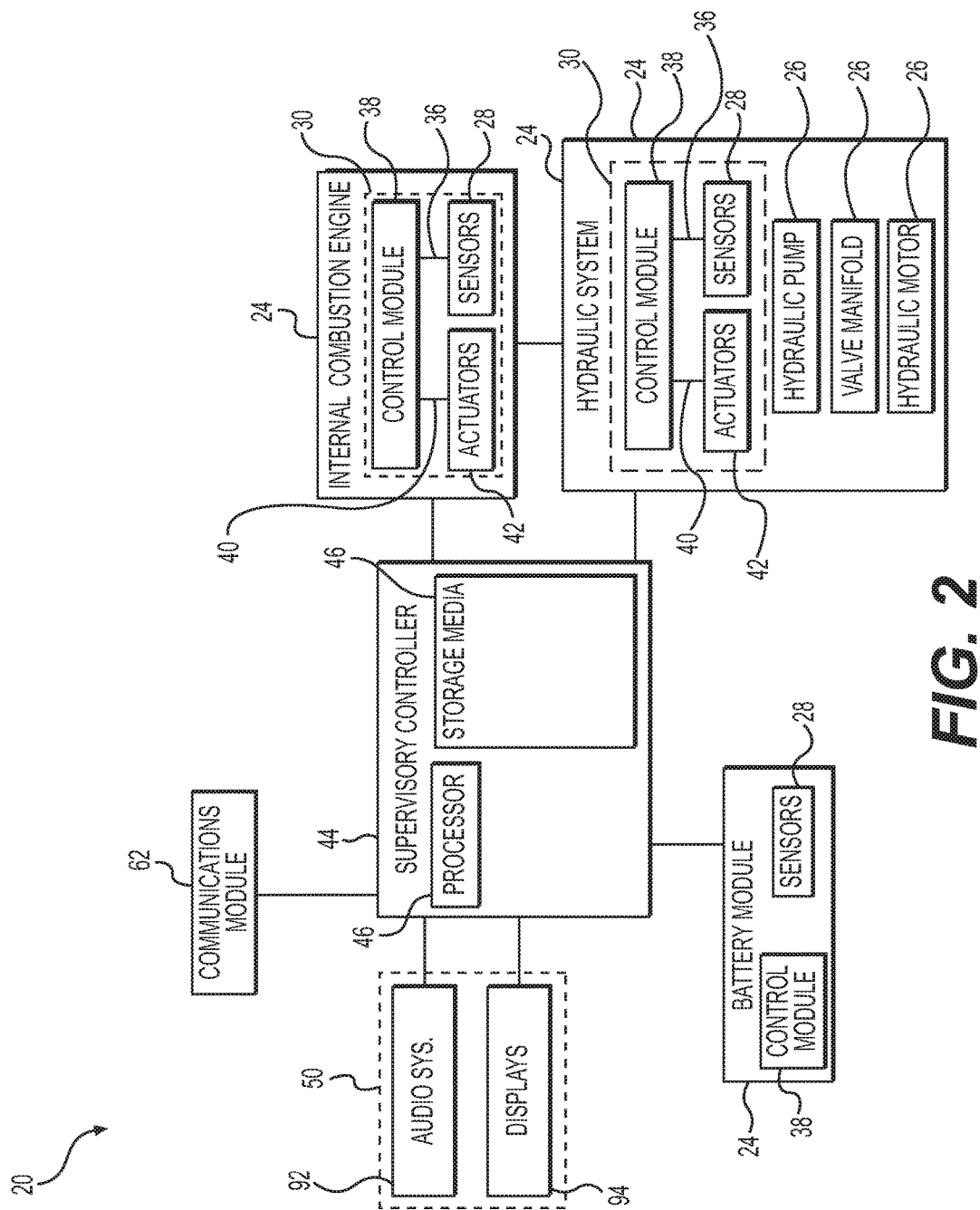
FIG. 2 is a block diagram of a distributed system for monitoring vehicle operation.

As provided in FIGS. 1-2, the distributed system 20 includes a plurality of physical systems 24 within the vehicle 22. The physical systems 24 may include, for example, an engine, a transmission, a hydraulic system, a battery module, and a chassis electrical system. Each of the physical systems 24 has a plurality of components 26. For example, a physical system 24 that is a hydraulic system may have components 26 that include a hydraulic pump, a valve manifold, and several different hydraulic motors for moving different parts of the vehicle 22. The distributed system 20 includes plurality of sensors 28, each measuring one or more physical properties on the vehicle 22.

The distributed system 20 also includes a plurality of subsystems 30 within the vehicle 22, such as, for example, a coolant circulation loop or a charge air system providing fresh air to the engine, or a compressor loop of an air conditioning system. As shown in FIG. 2 the subsystems 30 may each have one or more sensors 28 providing a feedback signal 36 to a control module 38.

A control module 38 provides a command signal 40 to an actuator 42. In practice, the vehicle 22 may include several different control modules 38, each controlling one or more associated physical systems 24, and/or subsystems 30. The control module 38 may be, for example, an engine control unit (ECU) or a transmission control unit (TCU) or a body control unit (BCU).

As shown in FIGS. 1-2, the distributed system 20 includes a supervisory controller 44 located in the vehicle 22 and including a first processor 46 and a first computer readable storage media 48 and in communication with the sensors 28 and the actuators 42 and with a user signaling device 50. The supervisory controller 44 may be a stand-alone computing device. Alternatively, the supervisory controller 44 may be integral with one of the control modules 38.

Figure 4:
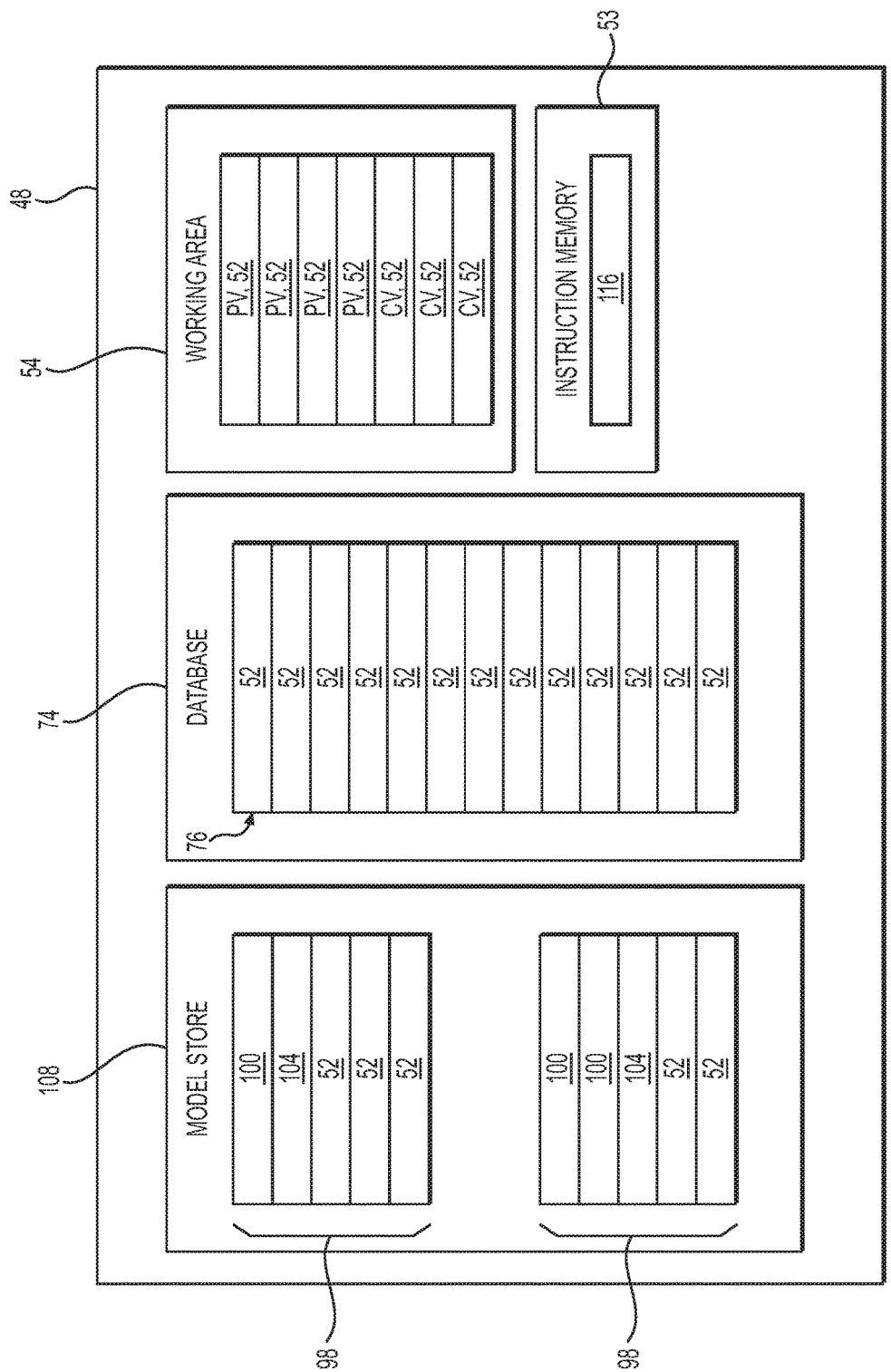
FIG. 4 is a block diagram of a first computer readable storage media within the supervisory controller.

As shown in FIG. 4, the first computer readable storage media 48 of the supervisory controller 44 includes a working area 54 of memory holding a plurality of operational parameters 52, each having an associated numeric value, and each associated with the status of the vehicle. For example, the operational parameters 52 may be a process variable PV, holding a numeric representation a physical property of one of the physical systems 24, or a control variable CV holding a numeric representation of one of the command signals 40 to one of the actuators 42. The operational parameters 52 may also include data regarding an operator of the vehicle 22, weather and other environmental factors experienced by the vehicle 22 such as, for example, lighting conditions, humidity, visibility, terrain, roadway data, and route data. The first computer readable storage media 48 of the supervisory controller 44 includes an instruction memory 53 holding machine readable instructions for execution by the first processor 46. The machine readable instructions within the instruction memory 53 may be any type of machine readable instructions such as compiled or interpreted program code.

As shown in FIG. 1, the distributed system 20 includes a server 56 located remotely from the vehicle 22 and including a second processor 58 and a second computer readable storage media 60 and is in regular communications with the supervisory controller 44. The server 56 is also in regular communications with a plurality of other vehicles 22, each including at least one system similar or identical to one of the physical systems 24.

A communications module 62, such as a Wi-Fi radio or a cellular data modem, is in communication with the supervisory controller 44 for communicating with the server 56 via a first external network 64 and using a first communications channel 66.

A user interface device 68, such as a smartphone or tablet, is in communication with the server 56 via a second external network 70 and using a second communications channel 72. The first and second communications channels 66, 72 may be combined together as a single communications channel. Likewise, the first and second external networks 64, 70 may be the same network, which may be, for example, the Internet, a local-area network (LAN), or a wide-area network (WAN). One or both of the external networks 64, 70 may be a virtual network, such as a virtual private network (VPN) to provide secured communications.

As shown in FIG. 3A, a database 74 is located in the first computer readable storage media 48 and stores historical data 76 including values of the plurality of operational parameters 52 from different times. The database 74 may be alternatively or additionally located in the second computer readable storage media 60 of the server 56. In other words, the database 74 may exist in either or both of the supervisory controller 44 and/or the server 56. If the database 74 is located in both the supervisory controller 44 and the server 56, the exact same information may be stored on each (i.e. in a mirrored arrangement), or different data may be stored on each such as, with a caching type arrangement. The database 74 may include operational parameters 52 from a plurality of different vehicles 22.

Figure 6:
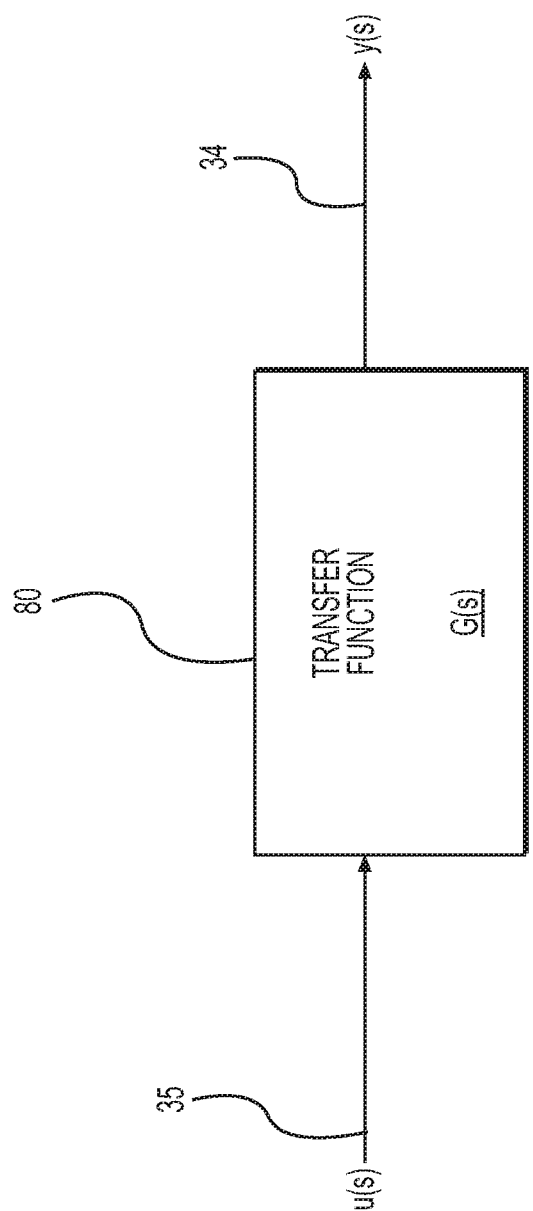
FIG. 6 is a block diagram of an example transfer function.
Figure 7:
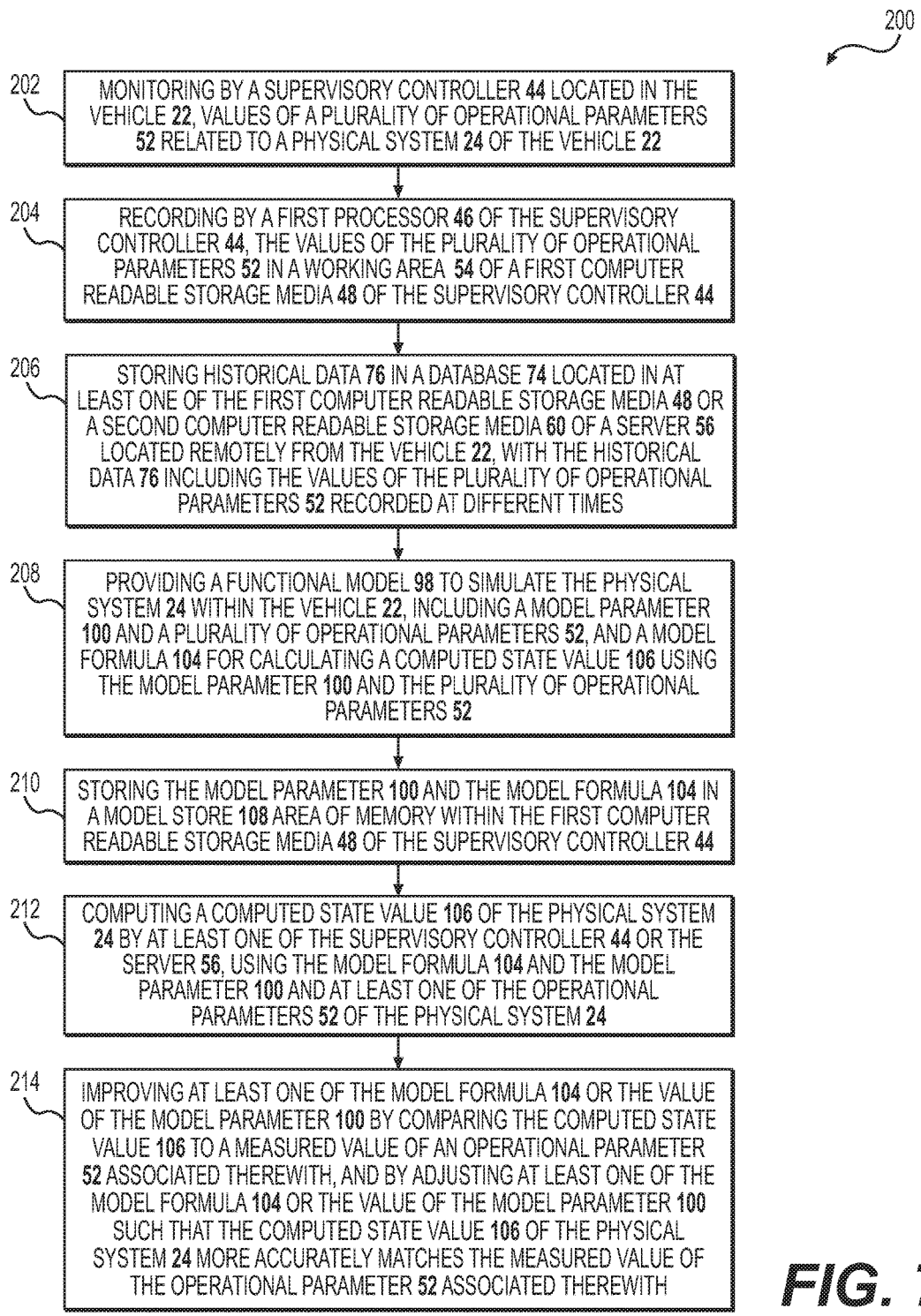
FIG. 7 is a flow chart illustrating method steps of an embodiment for monitoring vehicle operation according to an aspect of the disclosure.
Figure 8:
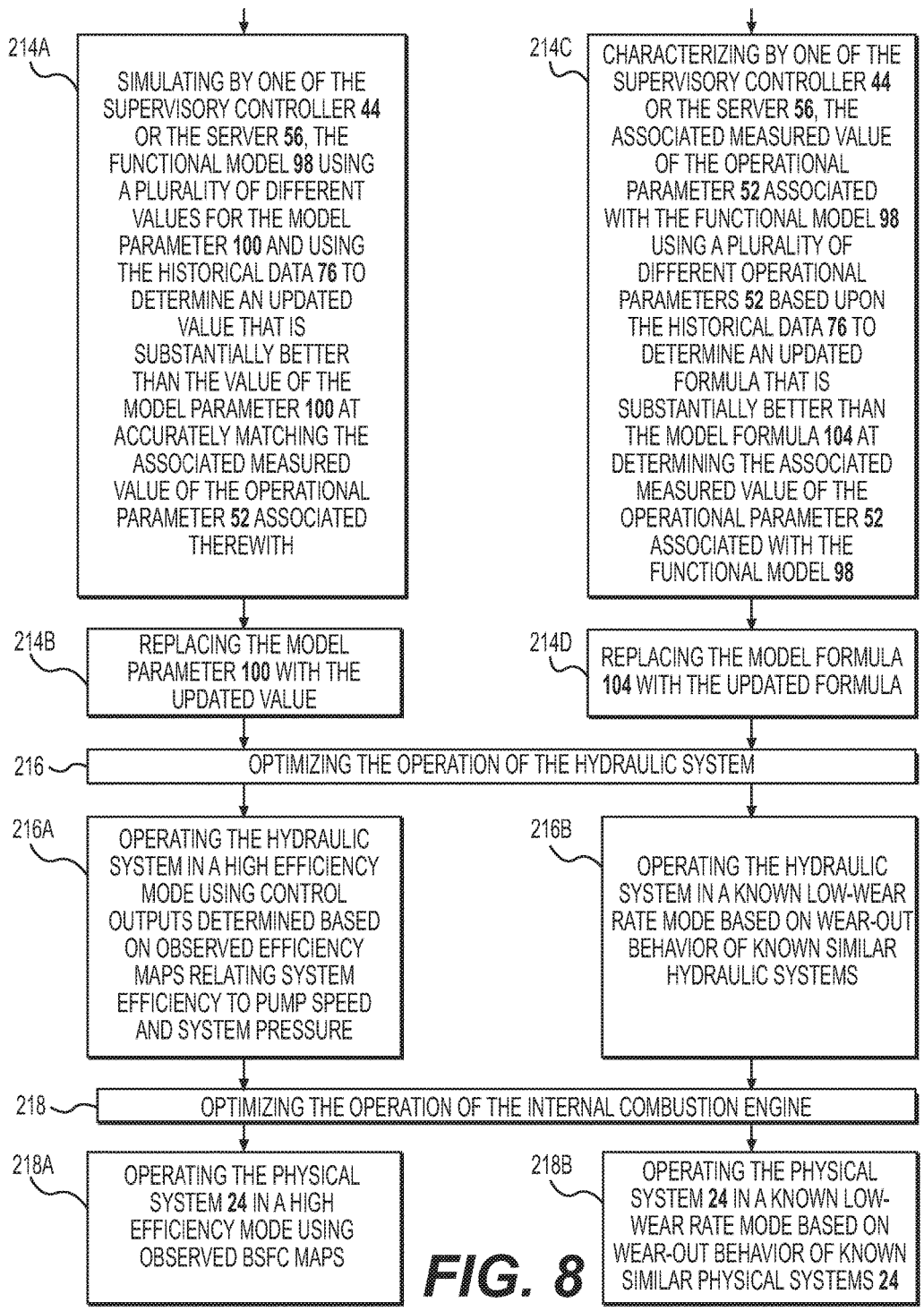
FIG. 8 is a flow chart illustrating method steps.
Figure 9:
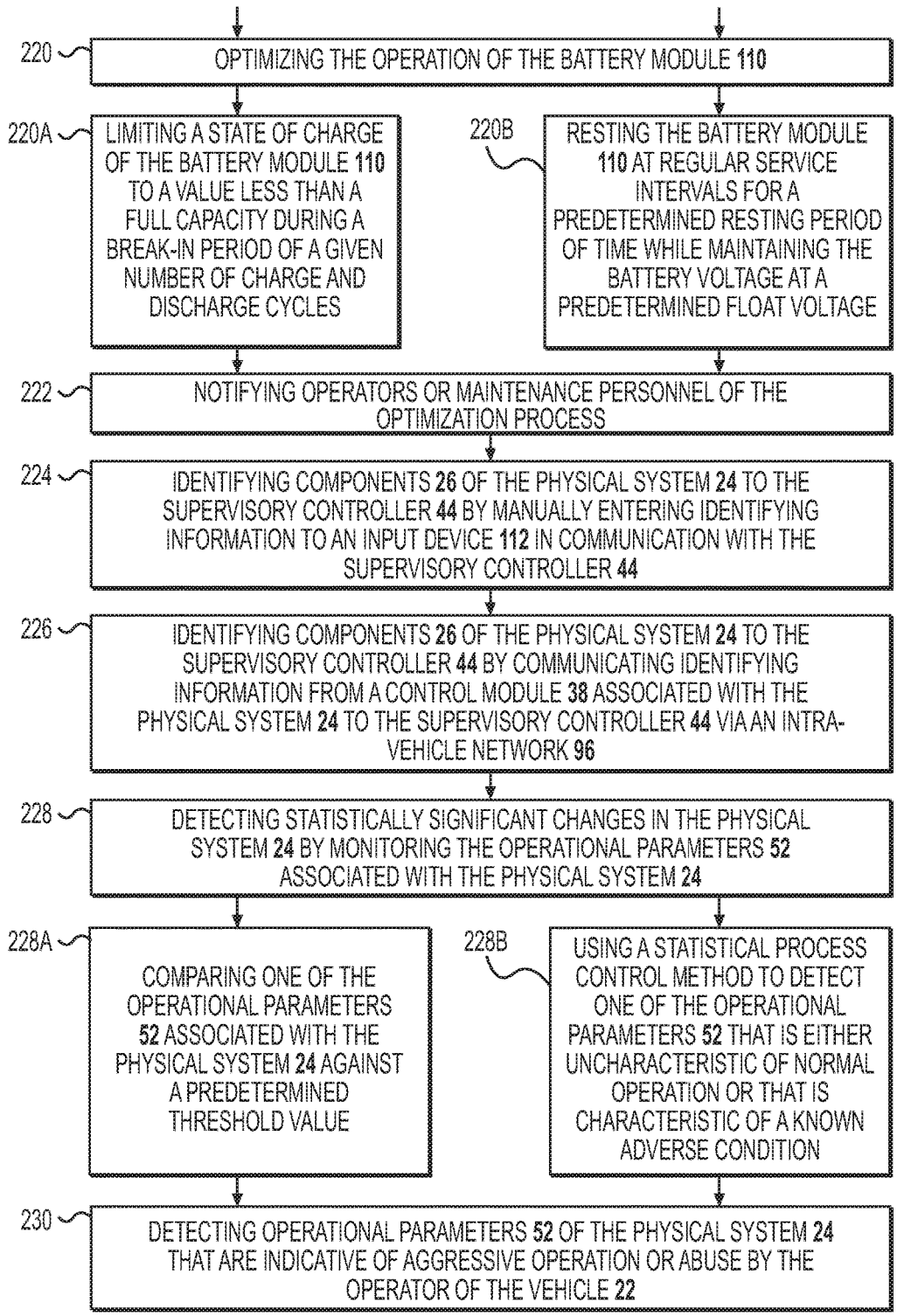
FIG. 9 is a flow chart illustrating method steps.
Figure 10:
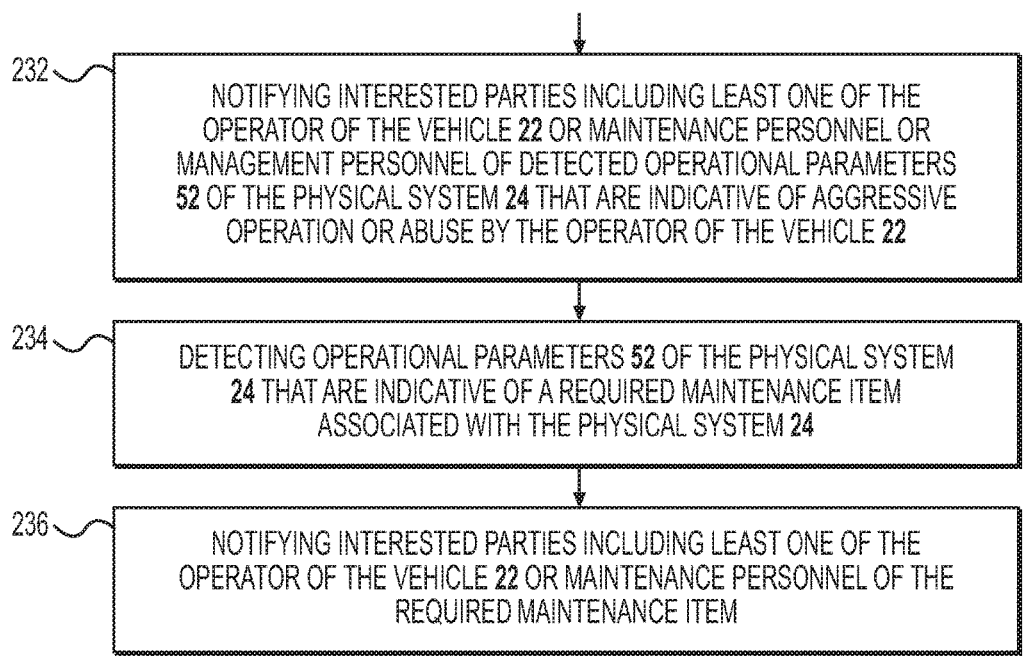
FIG. 10 is a flow chart illustrating method steps.
Figure 11:
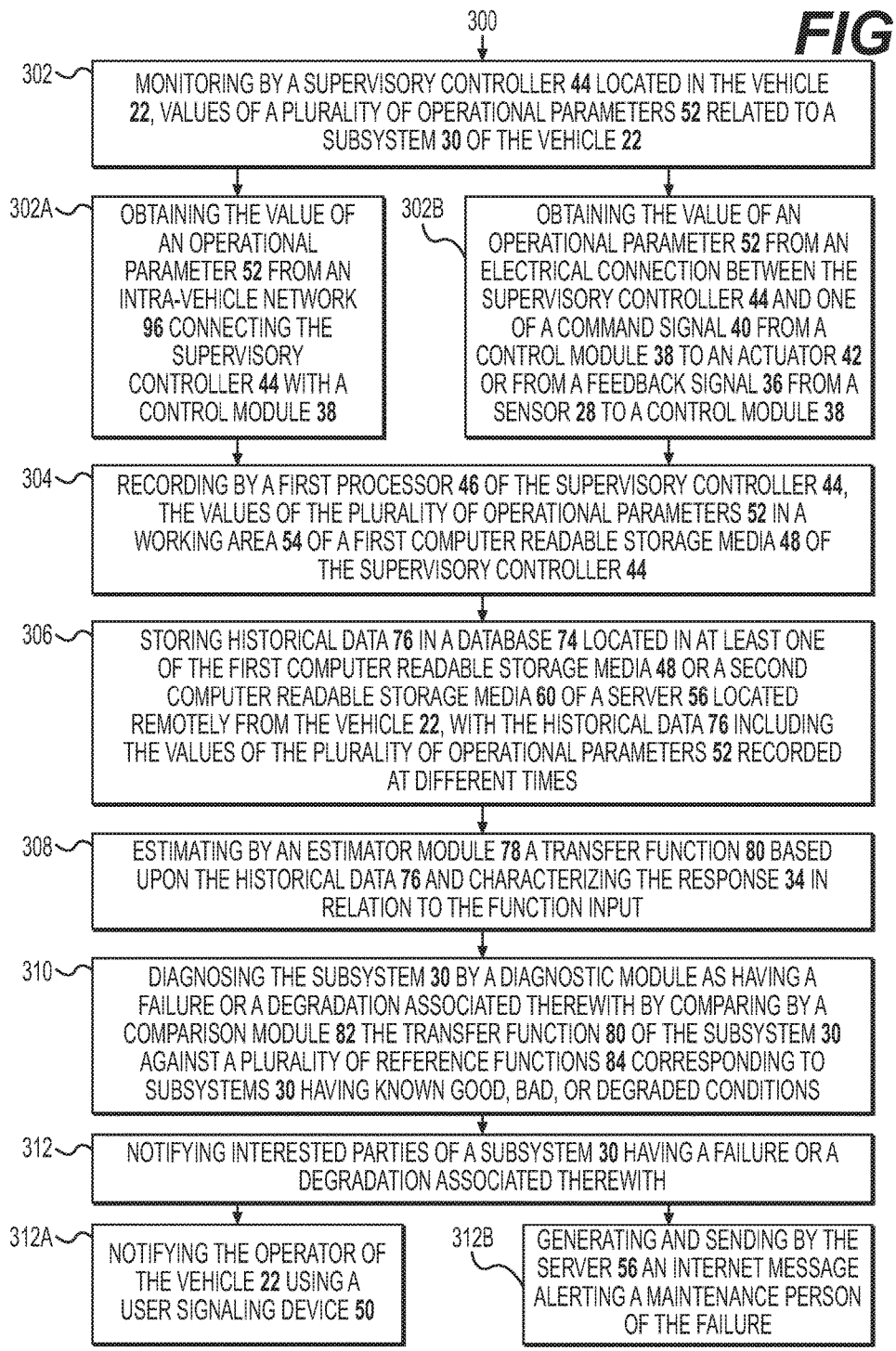
FIG. 11 is a flow chart illustrating method steps of an embodiment for monitoring vehicle operation according to an aspect of the disclosure.
Figure 12:
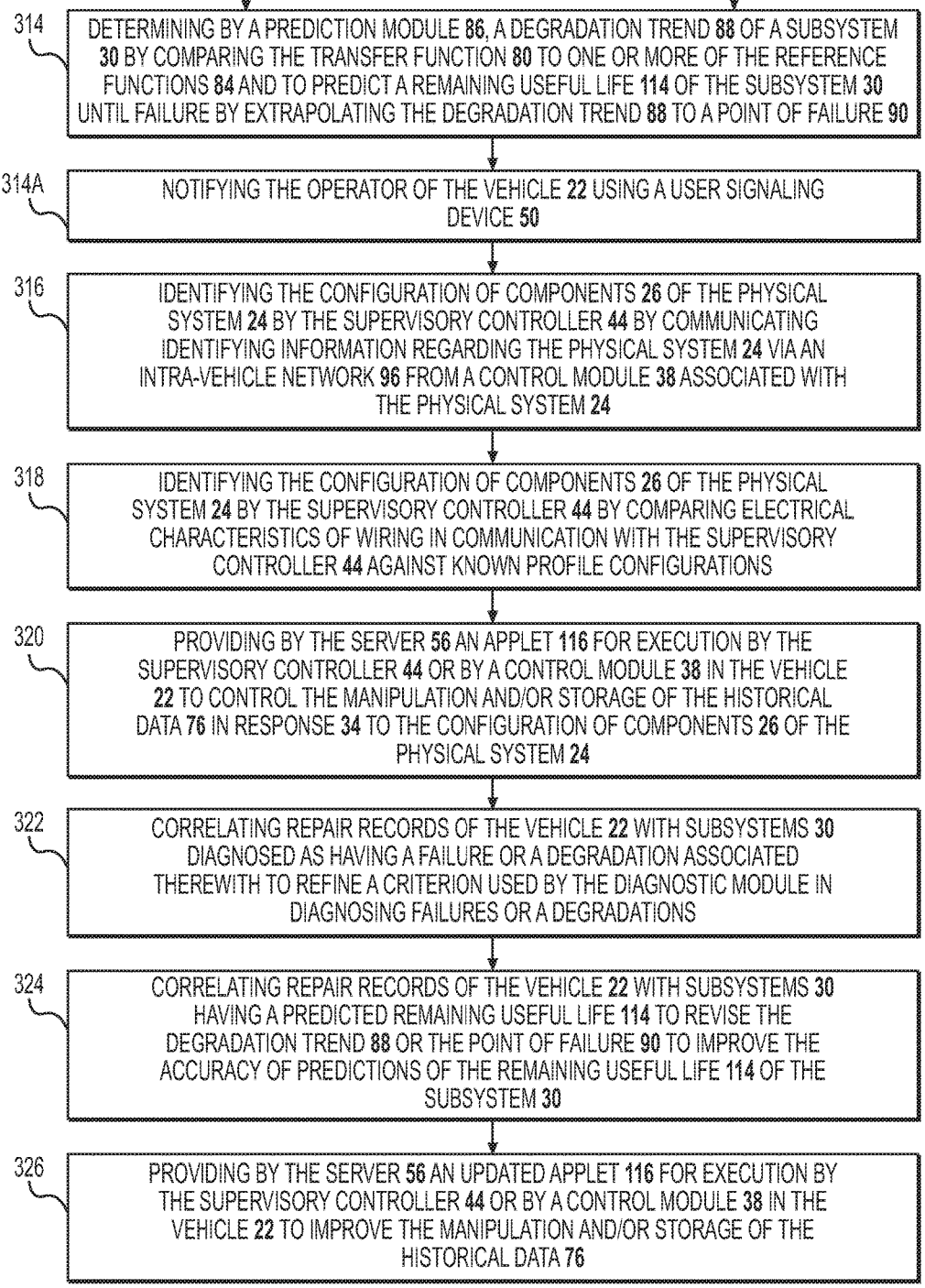
FIG. 12 is a flow chart illustrating method steps.
Figure 13:
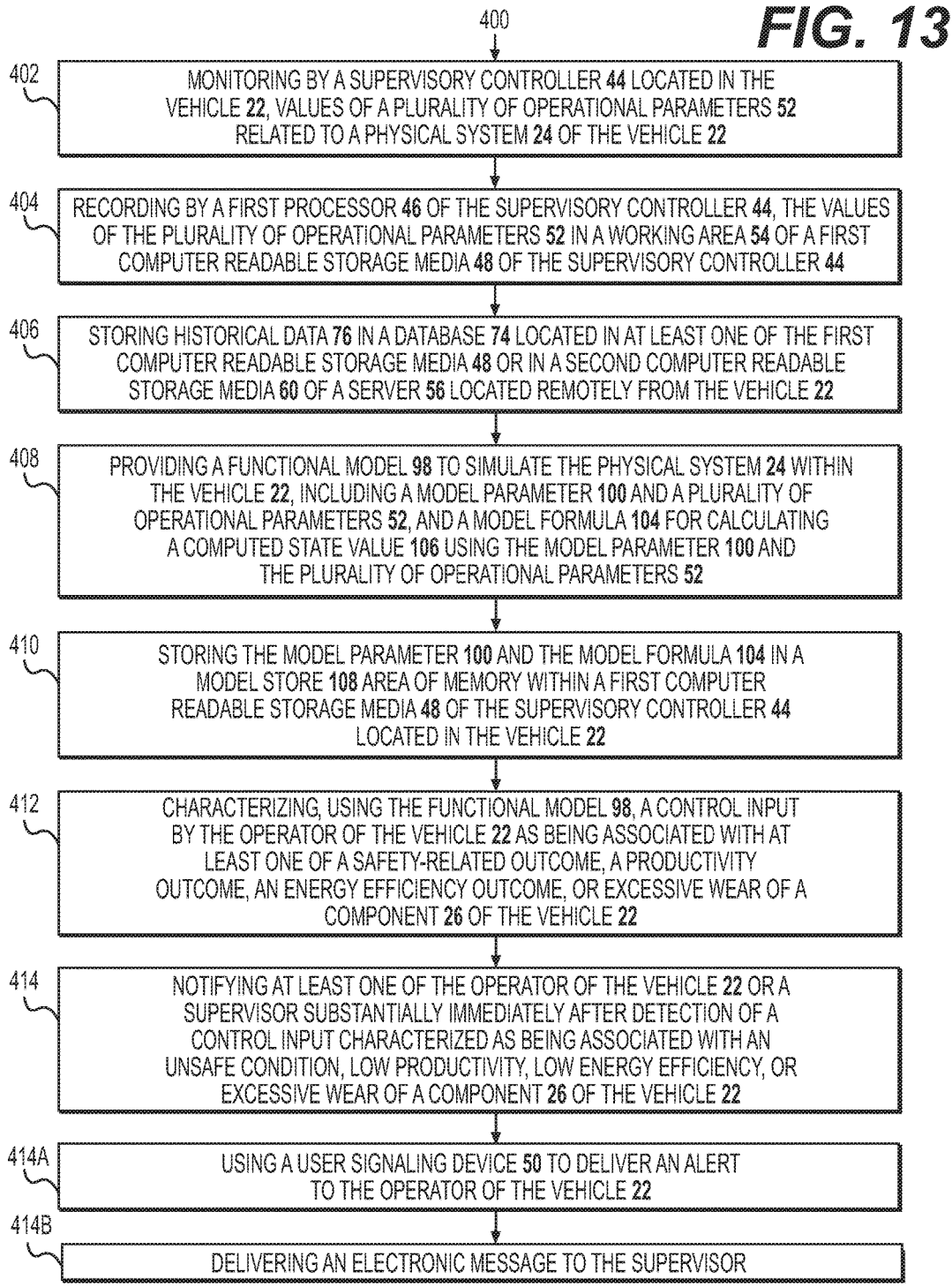
FIG. 13 is a flow chart illustrating method steps of an embodiment for monitoring vehicle operation according to an aspect of the disclosure.
Figure 14:
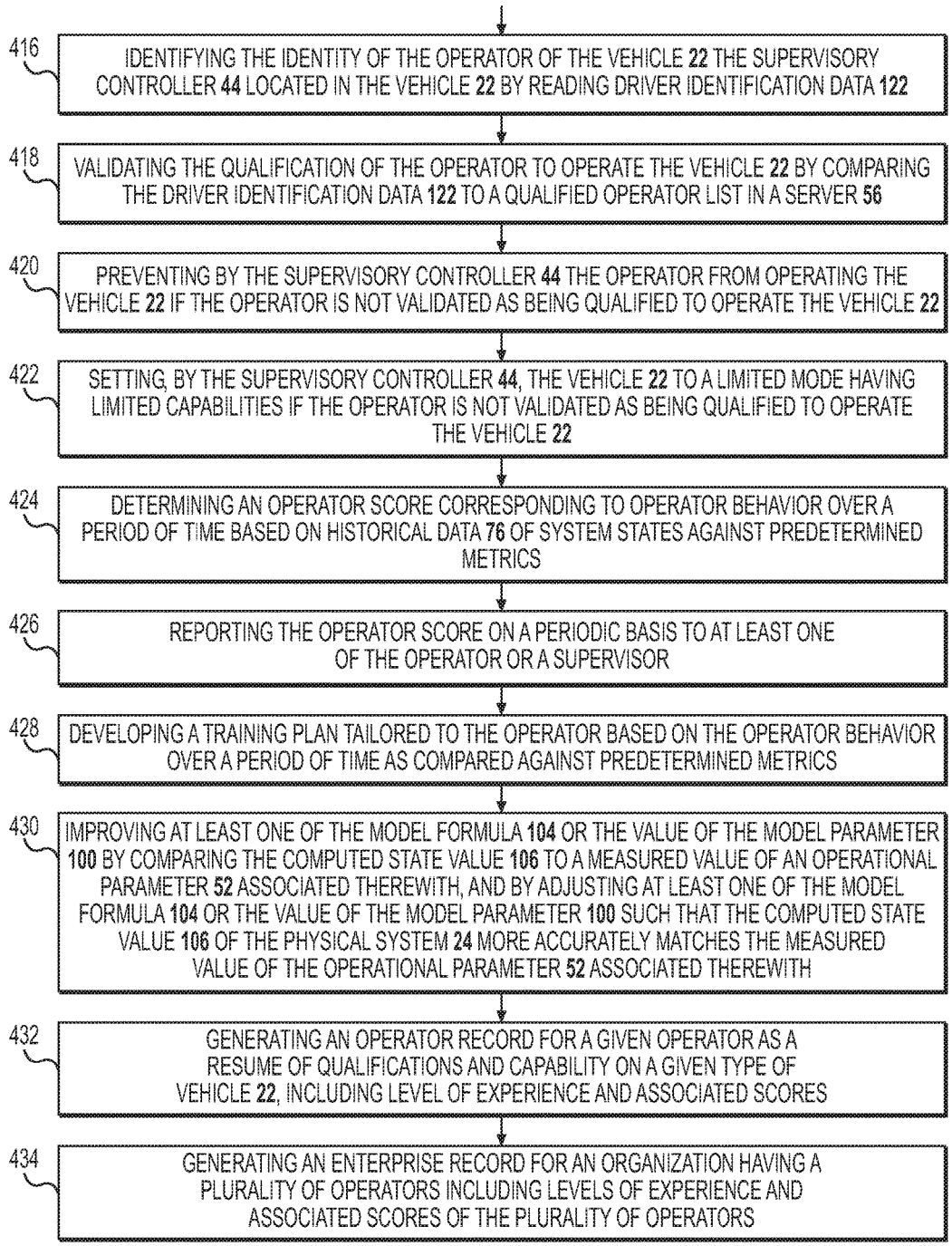
FIG. 14 is a flow chart illustrating method steps.
Figure 15:
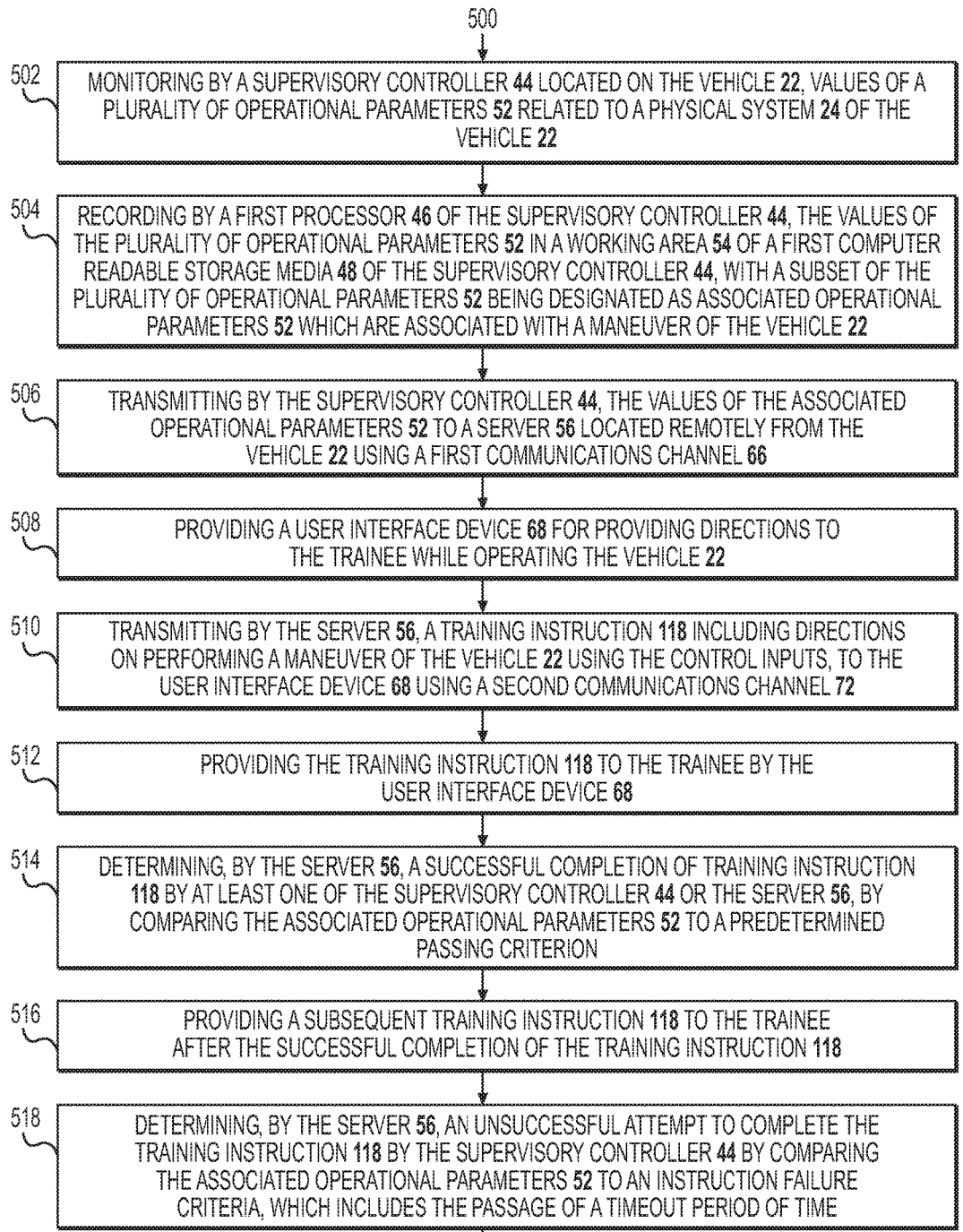
FIG. 15 is a flow chart illustrating method steps of an embodiment for monitoring vehicle operation according to an aspect of the disclosure.
Figure 16:
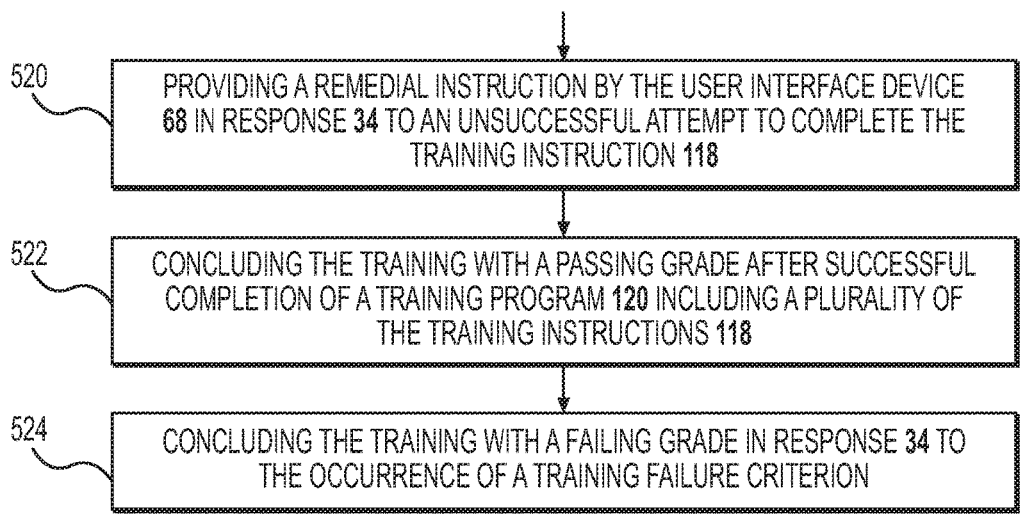
FIG. 16 is a flow chart illustrating method steps.

As shown in FIG. 3A, an estimator module 78 is provided and configured to estimate a transfer function 80 based upon the historical data 76 and characterizing the response 34 in relation to a function input 35, which is an operational parameter 52. A diagrammatic example of the transfer function 80 is shown in FIG. 6. The estimator module 78 may be located in either or both of the supervisory controller 44 and/or the server 56. The estimator module 78 may include hardware, software, or a combination thereof.

As shown in FIG. 3A, a comparison module 82 is also provided. The comparison module 82 is configured to compare the transfer function 80 of the subsystem 30 against a plurality of reference functions 84 corresponding to subsystems 30 having known good, bad, or degraded conditions, and for characterizing the subsystem 30 relative to those subsystems 30 having known good, bad, or degraded conditions. The comparison module 82 may be located in either or both of the supervisory controller 44 and/or the server 56. The comparison module 82 may include hardware, software, or a combination thereof.

Figure 5:
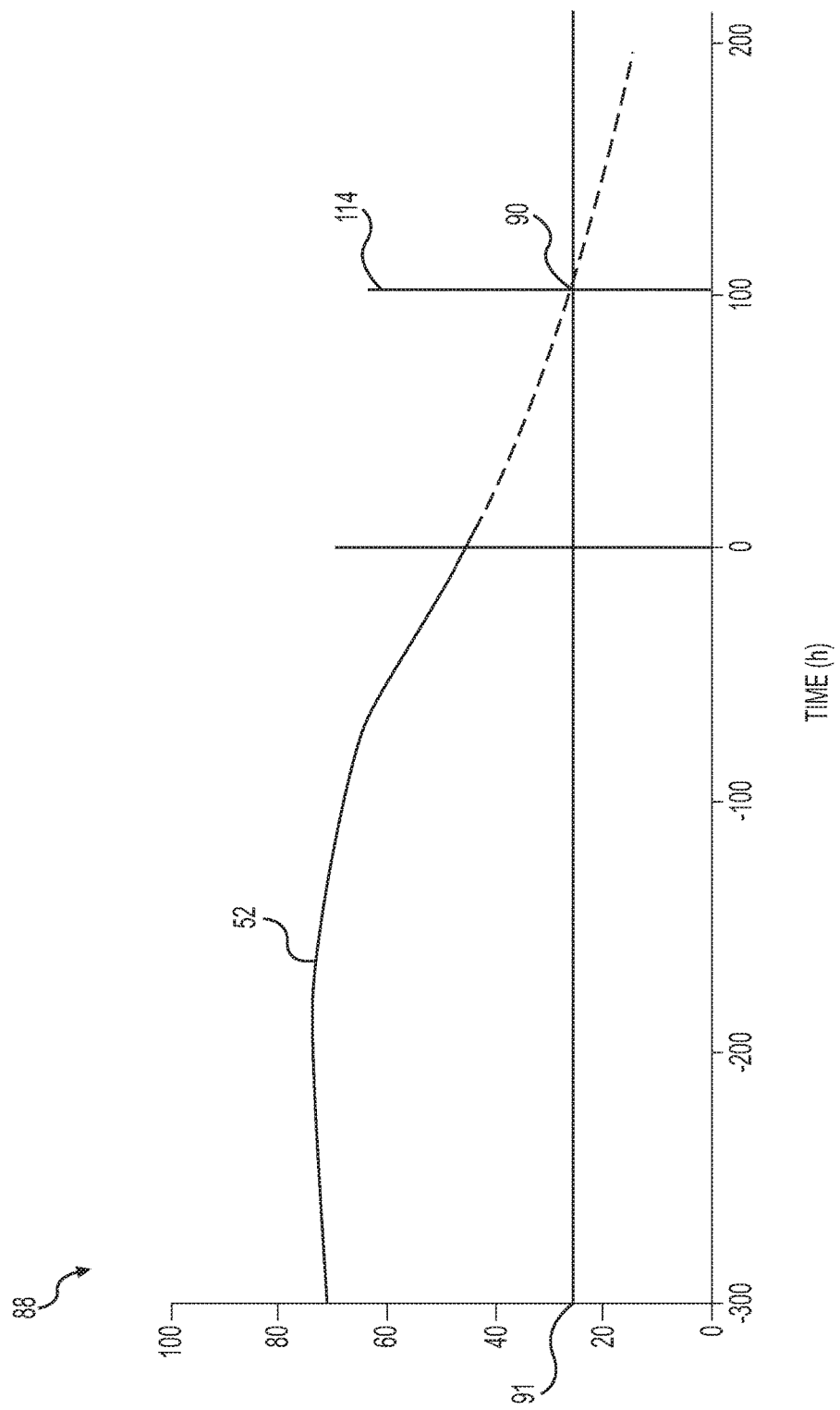
FIG. 5 is a graph of a degradation trend, showing the value of an operational parameter over time.

As shown in FIG. 3A, a prediction module 86 is also provided. The prediction module 86 is configured to determine a degradation trend 88 of an operational parameter 52 of the subsystem 30 by comparing the transfer function 80 to one or more of the reference functions 84 and to predict a point of failure 90 of the subsystem 30, when the value of the operational parameter 52 is equal to a predetermined failure value 91 An example of such a degradation trend 88 is shown in the graph of FIG. 5. In other words, the degradation trend 88 includes the historical value of an operational parameter 52, as shown by the solid line before time 0, and forecasts or extrapolates the value of the operational parameter 52 after time 0 (as shown by the dashed line) in order to determine a remaining useful life 114, which is the time value at the point of failure 90. The prediction module 86 may be located in either or both of the supervisory controller 44 and/or the server 56. The prediction module 86 may include hardware, software, or a combination thereof.

As shown in FIG. 2, the distributed system 20 further includes a user signaling device 50, which may include an audio signaling device 92 and/or a visual signaling device 94 for providing a corresponding signal to a driver of the vehicle 22. For example, an audio signaling device 92 may include a stand-alone buzzer or speakers of an audio or infotainment system in the vehicle 22 configured to play a predetermined sound such as a chime or tone. The visual signaling device 94 may include a telltale type warning light, or one or more graphic indicators on a display screen such as on an infotainment system or in a driver information screen of an instrument cluster in the vehicle 22. Furthermore, the visual signaling device 94 may include a plurality of different indicators to show the relative quality of an action or a quantity of some other variable. One example of such a visual signaling device 94 is the D-MAS (Driver Maneuver Awareness System) by Traffilog Fleet Management Solutions, which includes a cluster mounted on the dashboard of the vehicle 22 with several different colored lights, and which is used to notify the driver in real time of any unsafe or inefficient maneuvers that they have conducted.

As shown in FIG. 2, the distributed system 20 also includes an intra-vehicle network 96 for communicating the operational parameters 52 from one of the control modules 38 to the supervisory controller 44. The intra-vehicle network 96 may be, for example, a CAN bus, CAN FD, FlexRay, or a local Ethernet network A first method 200 for monitoring of a vehicle 22 is provided. The first method 200 includes 202 monitoring by a supervisory controller 44 located in the vehicle 22, values of a plurality of operational parameters 52 related to a physical system 24 of the vehicle 22.

The first method 200 also includes 204 recording by a first processor 46 of the supervisory controller 44, the values of the plurality of operational parameters 52 in a working area 54 of a first computer readable storage media 48 of the supervisory controller 44.

The first method 200 also includes 206 storing historical data 76 in a database 74 located in at least one of the first computer readable storage media 48 or a second computer readable storage media 60 of a server 56 located remotely from the vehicle 22, with the historical data 76 including the values of the plurality of operational parameters 52 recorded at different times.

The first method 200 also includes 208 providing a functional model 98 to simulate the physical system 24 within the vehicle 22, including a model parameter 100 and a plurality of operational parameters 52, and a model formula 104 for calculating a computed state value 106 using the model parameter 100 and the plurality of operational parameters 52.

The first method 200 also includes 210 storing the model parameter 100 and the model formula 104 in a model store 108 area of memory within the first computer readable storage media 48 of the supervisory controller 44.

The first method 200 also includes 212 computing a computed state value 106 of the physical system 24 by at least one of the supervisory controller 44 or the server 56, using the model formula 104 and the model parameter 100 and at least one of the operational parameters 52 of the physical system 24.

The first method 200 also includes 214 improving at least one of the model formula 104 or the value of the model parameter 100 by comparing the computed state value 106 to a measured value of an operational parameter 52 associated therewith, and by adjusting at least one of the model formula 104 or the value of the model parameter 100 such that the computed state value 106 of the physical system 24 more accurately matches the measured value of the operational parameter 52 associated therewith. Historical measured values from the database 74, and/or measured values from a plurality of different vehicles 22 having similar physical systems 24 may be used. The amount of improvement may need to be above some improvement threshold, for example, a 2% improvement in accuracy may be required over 95% of the time. Also, a worst-case accuracy threshold may be used as well. For example, a new model formula 104 or model parameter 100 value model may not be used if it results in a loss in accuracy greater than 5% at any given time (i.e. for any inputs to the model, the output cannot be more than 5% different than the measured value).

Step 214 may include the sub-steps of: 214A simulating by one of the supervisory controller 44 or the server 56, the functional model 98 using a plurality of different values for the model parameter 100 and using the historical data 76 to determine an updated value that is substantially better than the value of the model parameter 100 at accurately matching the associated measured value of the operational parameter 52 associated therewith. Step 214 may also include the sub-step of: 214B replacing the model parameter 100 with the updated value.

Step may include the sub-step of: 214C characterizing by one of the supervisory controller 44 or the server 56, the associated measured value of the operational parameter 52 associated with the functional model 98 using a plurality of different operational parameters 52 based upon the historical data 76 to determine an updated formula that is substantially better than the model formula 104 at determining the associated measured value of the operational parameter 52 associated with the functional model 98. Step 214 may also include the sub-step of: 214D replacing the model formula 104 with the updated formula.

According to an aspect, the first method 200 may be used where the physical system 24 is a hydraulic system. In that case, the operational parameters 52 may include, for example, one or more of: hydraulic system power, pump and motor torque, pump and motor flow, ram position, ram movement, oil temperature, oil filter delta-P, accumulator capacity, regulator valve function, solenoid valve function, PWM solenoid valve function, closed-loop system pressure, open loop system pressure, oil reservoir level, pump/motor displacement, charge pump pressure, or maintenance activity associated with the hydraulic system.

In the case of the physical system 24 being a hydraulic system, the first method 200 may proceed with the step of 216 optimizing the operation of the hydraulic system, which may include one of: 216A optimizing the operation of the hydraulic system by at least one of: operating the hydraulic system in a high efficiency mode using control outputs determined based on observed efficiency maps relating system efficiency to pump speed and system pressure, or 216B operating the hydraulic system in a known low-wear rate mode based on wear-out behavior of known similar hydraulic systems. The mode to be used may be configured depending on the economics of the service use of the vehicle 22. For example, a vehicle 22 in use a large percentage of the time, such as a piece of heavy equipment used for regular service in, for example, a mining operation or a garbage dump, may benefit most from being operated to optimize for fuel efficiency. Such a vehicle may also be fitted with high efficiency motor and/or pump, which may be especially responsive to operating in a "sweet-spot" for peek efficiency. A vehicle that is in more regular service, such as a piece of equipment used on and off on a construction site may benefit more from optimizing for low-wear. The mode to be used may be changed, depending on the service the vehicle is to be used for, or for reasons such as, for example, in response to a large change in the cost of fuel, which may make a high-efficiency mode more economical.

According to an aspect, the first method 200 may be used where the physical system 24 is an internal combustion engine. In that case, the operational parameters 52 may include, for example, one or more of: engine speed, engine load, coolant temperature, oil temperature, fuel flow, air filter delta-P, or maintenance activity associated with the internal combustion engine.

In the case of the physical system 24 being an internal combustion engine, the first method 200 may proceed with the step of 218 optimizing the operation of the internal combustion engine by at least one of: 218A operating the physical system 24 in a high efficiency mode using observed BSFC maps, or 218B operating the physical system 24 in a known low-wear rate mode based on wear-out behavior of known similar physical systems 24.

According to an aspect, the first method 200 may be used where the physical system 24 is a battery module. In that case, the operational parameters 52 may include, for example, one or more of: battery current, battery voltage, battery temperature, battery state of charge, or maintenance activity associated with the battery module. The operational parameters 52 may correspond to the entire battery module or a sub-assembly within the battery module or even for a single electrochemical cell within the battery module. All or parts of the battery module may be modeled, for example, using a Randles circuit cell model.

In the case of the physical system 24 being a battery module, the first method 200 may proceed with the step of 220 optimizing the operation of the battery module based on current system state of the physical system 24 and historical data 76 associated with the battery module.

According to an aspect, the step of 220 optimizing the operation of the battery module may further comprise at least one of: 220A limiting a state of charge of the battery module to a value less than a full capacity during a break-in period of a given number of charge and discharge cycles, and/or 218B resting the battery module at regular service intervals for a predetermined resting period of time while maintaining the battery voltage at a predetermined float voltage.

The first method 200 may also include the step of 222 notifying operators or maintenance personnel of the optimization process.

According to an aspect the first method 200 may also include 224 identifying components 26 of the physical system 24 to the supervisory controller 44 by manually entering identifying information to an input device 112 in communication with the supervisory controller 44. This step may be performed at the factory during initial construction, at the time of service or upgrading the vehicle 22, or at another time, such as at the time of configuration of the distributed system 20. This step may be performed by a technician using, for example, a programming terminal. Alternatively, this step may be performed by an owner or operator using, for example, an infotainment screen as the input device 112. The step of identifying components 26 may include entering or selecting a model number or component 26 type, or entry of a unique ID (e.g. a serial number), type ID (e.g. model number), or some combination thereof. The identification may include entry of other information such as, for example, the manufacturer or supplier, of one or more parts of the physical system 24, batch number, production date, etc.

According to an aspect the first method 200 may also include 226 identifying components 26 of the physical system 24 to the supervisory controller 44 by communicating identifying information from a control module 38 associated with the physical system 24 to the supervisory controller 44 via an intra-vehicle network 96 such as, for example, a controller area network (CAN) network. This step may include, for example, extracting data such as model identification and/or serial number of the control module 38 or other physical devices such as, an engine model or a transmission model, or a model and/or capacity of a battery pack.

The first method 200 may also include 228 detecting statistically significant changes in the physical system 24 by monitoring the operational parameters 52 associated with the physical system 24. The statistically significant changes may be determined using statistical process control methods, such as a control chart, to determine one or more of the operational parameters 52, which are, alone or in combination, indicative of abnormal operation. One or more indicators or signatures of statistically significant changes may be pre-programmed based on known characteristics of similar physical systems 24, based on design data, warranty data, and/or by monitoring the operational parameters 52 from a plurality of different similarly equipped vehicles 22 by the server 56.

As shown in FIG. 3A, an event detector module 124 within the supervisory controller 44 may perform this step. The event detector module 124 may include hardware, software, or a combination thereof.

According to an aspect, the step of 228 detecting statistically significant changes in the physical system 24 includes may include 228A comparing one of the operational parameters 52 associated with the physical system 24 against a predetermined threshold value.

Alternatively, the step of 228 detecting statistically significant changes in the physical system 24 may include 228B using a statistical process control method to detect one of the operational parameters 52 that is either uncharacteristic of normal operation or that is characteristic of a known adverse condition. For example, the one of the operational parameters 52 may be trending over time in a fashion that is characteristic of a known adverse condition such as a worn-out component or a dirty filter that should be replaced or otherwise maintained.

The first method 200 may include 230 notifying at least one of the operator of the vehicle 22 or maintenance personnel of a detected statistically significant changes in the physical system 24.

According to an aspect, the first method 200 may further include 230 detecting operational parameters 52 of the physical system 24 that are indicative of aggressive operation or abuse by the operator of the vehicle 22.

The first method 200 may also include 232 notifying interested parties including least one of the operator of the vehicle 22 or maintenance personnel or management personnel of detected operational parameters 52 of the physical system 24 that are indicative of aggressive operation or abuse by the operator of the vehicle 22. This step of providing notifications may include providing immediate notifications such as with an email or other electronic message. The notifications may also take the form of recorded events in a log or on a report card associated with the vehicle 22 and/or in a log or report card associated with the operator of the vehicle 22.

According to an aspect, the first method 200 may further include 234 detecting operational parameters 52 of the physical system 24 that are indicative of a required maintenance item associated with the physical system 24.

The first method 200 may also include 236 notifying interested parties including least one of the operator of the vehicle 22 or maintenance personnel of the required maintenance item. This step of providing notifications may include providing immediate notifications such as with an email or other electronic message. The notifications may also take the form of recorded events in a log or on a report card associated with the vehicle 22. The notification may include automatically scheduling the vehicle 22 for maintenance.

A second method 300 for monitoring of a vehicle 22 is also provided. The second method 300 includes 302 monitoring by a supervisory controller 44 located in the vehicle 22, values of a plurality of operational parameters 52 related to a subsystem 30 of the vehicle 22. According to an aspect, step 302 may include 302A obtaining the value of an operational parameter 52 from an intra-vehicle network 96 connecting the supervisory controller 44 with a control module 38. According to an another aspect, step 302 may include 302B obtaining the value of an operational parameter 52 from an electrical connection between the supervisory controller 44 and one of a command signal 40 from a control module 38 to an actuator 42 or from a feedback signal 36 from a sensor 28 to a control module 38.

The subsystem 30 may be a "system of interest," which may be predetermined from the factory, such as, for example, a safety related subsystem 30, or one that directly impacts efficiency or regulatory compliance such as, for example, a diesel exhaust fluid system. A "system of interest," may also be determined after a vehicle 22 is in the field. For example, if an unusually number of vehicles 22 having a given configuration are being returned for warranty repairs related to headlight and turn signal malfunctions, that body electrical subsystem 30 may be deemed a "system of interest", and additional monitoring and logging may be conducted regarding related operational parameters 52 such as, for example, bus voltage, switch status, and/or detections of malfunctioning signal bulbs.

The second method 300 also includes 304 recording by a first processor 46 of the supervisory controller 44, the values of the plurality of operational parameters 52 in a working area 54 of a first computer readable storage media 48 of the supervisory controller 44.

The second method 300 also includes 306 storing historical data 76 in a database 74 located in at least one of the first computer readable storage media 48 or a second computer readable storage media 60 of a server 56 located remotely from the vehicle 22, with the historical data 76 including the values of the plurality of operational parameters 52 recorded at different times.

The second method 300 also includes 308 estimating by an estimator module 78 a transfer function 80 based upon the historical data 76 and characterizing the response 34 in relation to the function input 35. A transfer function 80 may relate, for example, the time between a control action by an operator and a response 34 resulting from a control system and actuator 42 on the vehicle 22. The function input 35 may be any operational parameter 52 such as a feedback signal 36 from one of the sensors 28 or a command signal 40 from a control module 38. The function input 35 may also be calculated value based on several different operational parameters 52.

The second method 300 also includes 310 diagnosing the subsystem 30 by a diagnostic module 126 as having a failure or a degradation associated therewith by comparing by a comparison module 82 the transfer function 80 of the subsystem 30 against a plurality of reference functions 84 corresponding to subsystems 30 having known good, bad, or degraded conditions. The reference functions 84 may be generated using historical data of the subsystem 30, an idealized model of subsystem 30, as-built, or other measures. For example, the diagnostic module 126 may use statistical process control methods to diagnose the subsystem 30 as having a transfer function 80 that is outside of the normal, expected operation for that specific subsystem 30 and/or for subsystems 30 of similar physical systems 24 such as, for example, in other vehicles 22 having the same hardware configuration.

The comparison module 82 and/or the diagnostic module 126 may be located in the supervisory controller 44, in the server 56, or in both of the supervisory controller 44 and the server 56. For example, the comparison module 82 and/or the diagnostic module 126 may be capable of running on the supervisory controller 44 in a local-only mode if a connection to the server 56 is unavailable. The comparison module 82 and/or the diagnostic module 126 may also be capable of running in a distributed mode with connection to the server 56. The distributed mode may allow, for example, data regarding the operation of similar subsystems 30 in a plurality of different vehicles 22 used by the diagnostic module 126 in diagnosing the subsystem 30 as having a failure or degradation. In other words, the distributed mode may allow either or both of comparison module 82 or the diagnostic module 126 to be more accurate by combining information from several different vehicles 22, each having a similar hardware configuration. For example, information regarding transfer functions 80 relating to an engine cooling subsystem 30 may be relevant from a plurality of different vehicles having the same or similar engine types, even if other hardware components of those vehicles are different (e.g. different body styles).

The second method 300 also includes 312 notifying interested parties of a subsystem 30 having a failure or a degradation associated therewith. According to an aspect, step 310 may include 312A notifying the operator of the vehicle 22 of a failed or degraded subsystem 30 using a using a user signaling device 50. According to an aspect, step 312 may include 312B generating and sending by the server 56 an internet message alerting a maintenance person of the failure.

The second method 300 may further include 314 determining by a prediction module 86, a degradation trend 88 of a subsystem 30 by comparing the transfer function 80 to one or more of the reference functions 84 and to predict a remaining useful life 114 of the subsystem 30 until failure by extrapolating the degradation trend 88 to a point of failure 90. According to an aspect, step 314 may further include 314A notifying interested parties including least one of the operator of the vehicle 22 or maintenance personnel of the remaining useful life 114 of the subsystem 30.

The second method 300 may also include 316 identifying the configuration of components 26 of the physical system 24 by the supervisory controller 44 by communicating identifying information regarding the physical system 24 via an intra-vehicle network 96, such as, for example, a CAN bus or a local Ethernet network, from a control module 38 associated with the physical system 24.

The second method 300 may also include 318 identifying the configuration of components 26 of the physical system 24 by the supervisory controller 44 by comparing electrical characteristics of wiring in communication with the supervisory controller 44 against known profile configurations.

The second method 300 may also include 320 providing by the server 56 an applet 116 for execution by the supervisory controller 44 or by a control module 38 in the vehicle 22 to control the manipulation and/or storage of the historical data 76 in response 34 to the configuration of components 26 of the physical system 24. As shown in FIG. 4, the applet 116 may be located in the instruction memory 53 of the first computer readable storage media 48 of the supervisory controller 44.

The second method 300 may also include 322 correlating repair records of the vehicle 22 with subsystems 30 diagnosed as having a failure or a degradation associated therewith to refine a criterion used by the diagnostic module 126 in diagnosing failures or a degradations.

The second method 300 may also include 324 correlating repair records of the vehicle 22 with subsystems 30 having a predicted remaining useful life 114 to revise the degradation trend 88 or the point of failure 90 to improve the accuracy of predictions of the remaining useful life 114 of the subsystem 30.

The second method 300 may also include 326 providing by the server 56 an updated applet 116 for execution by the supervisory controller 44 or by a control module 38 in the vehicle 22 to improve the manipulation and/or storage of the historical data 76.

A third method 400 for monitoring of a vehicle 22 is also provided. The third method 400 includes 402 monitoring by a supervisory controller 44 located in the vehicle 22, values of a plurality of operational parameters 52 related to a physical system 24 of the vehicle 22. The operational parameters 52 include control inputs by an operator of the vehicle 22, such as, for example, throttle, brake, gear selection and steering inputs.

The third method 400 also includes 404 recording by a first processor 46 of the supervisory controller 44, the values of the plurality of operational parameters 52 in a working area 54 of a first computer readable storage media 48 of the supervisory controller 44.

The third method 400 also includes 406 storing historical data 76 in a database 74 located in at least one of the first computer readable storage media 48 or in a second computer readable storage media 60 of a server 56 located remotely from the vehicle 22, with the historical data 76 including the values of the plurality of operational parameters 52 recorded at different times.

The third method 400 also includes 408 providing a functional model 98 to simulate the physical system 24 within the vehicle 22, including a model parameter 100 and a plurality of operational parameters 52, and a model formula 104 for calculating a computed state value 106 using the model parameter 100 and the plurality of operational parameters 52.

The third method 400 also includes 410 storing the model parameter 100 and the model formula 104 in a model store 108 area of memory within a first computer readable storage media 48 of the supervisory controller 44 located in the vehicle 22.

The third method 400 also includes 412 characterizing, using the functional model 98, a control input by the operator of the vehicle 22 as being associated with at least one of a safety-related outcome, a productivity outcome, an energy efficiency outcome, or excessive wear of a component 26 of the vehicle 22.

The third method 400 proceeds with 414 notifying at least one of the operator of the vehicle 22 or a supervisor substantially immediately after detection of a control input characterized as being associated with an unsafe condition, low productivity, low energy efficiency, or excessive wear of a component 26 of the vehicle 22.

According to an aspect, step 414 may include 414A using a user signaling device 50 to deliver an alert to the operator of the vehicle 22. According to an aspect, step 414 may include 414B delivering an electronic message to the supervisor. Step 414 may be accomplished by other means such as, for example, providing a detailed report to either or both of the operator and to a supervisor or other interested persons on a periodic basis or as a result of some condition such as, for example, after an accident or if the operator is applying for another position or for qualification on a given piece of equipment.

The third method 400 may also include 416 identifying the identity of the operator of the vehicle 22 the supervisory controller 44 located in the vehicle 22 by reading driver identification data 122. The driver identification data 122 may take the form of biometric data regarding one or more physical features of the operator of the vehicle 22. The driver identification data 122 may alternatively or additionally include an identification number assigned to an individual operator. The driver identification data 122 may be manually entered by the operator. Alternatively, the may be electronically communicated to the supervisory controller 44 such as, for example, with an RFID identification device or with a magnetic swipe card or with an optical pattern such as a bar code or a QR code.

The third method 400 may also include 418 validating the qualification of the operator to operate the vehicle 22 by comparing the driver identification data 122 to a qualified operator list in a server 56. The third method 400 may further include 420 preventing by the supervisory controller 44 the operator from operating the vehicle 22 if the operator is not validated as being qualified to operate the vehicle 22. The third method 400 may further include 422 setting, by the supervisory controller 44, the vehicle 22 to a limited mode having limited capabilities if the operator is not validated as being qualified to operate the vehicle 22.

The limited mode may include allowing only predetermined training operations of the vehicle 22. Alternatively, or in addition, the limited mode may allow other limited operations such as, for example, moving the vehicle 22 within a limited geographical area and/or operating the vehicle 22 for a limited amount of time or only during limited days or times, and/or for limiting the load capacity of the vehicle 22 or limiting capacities of the vehicle 22 such as, for example, speed, power, throttle position, or other capabilities. For example, if the vehicle 22 is a loader having a bucket, the limited mode may allow the vehicle 22 to be driven, but may limit the articulation of the bucket as to inhibit the ability to do useful work. Such limited modes may be useful for example, to allow unqualified persons to obtain a qualification and/or to perform limited but necessary operations such as moving the vehicle 22 or driving the vehicle 22 onto or off of a trailer for transportation.

The third method 400 may also include 424 determining an operator score corresponding to operator behavior over a period of time based on historical data 76 of system states against predetermined metrics. The operator score may include for example, relative quality of vehicle 22 maneuvers, the number and severity of any unsafe, low productivity, low energy efficiency, or excessive wear conditions. See, for example, step, above. The operator score may include a categorical break-down of items such as safety, productivity, energy efficiency, and equipment handling (i.e. minimizing wear).

The third method 400 may also include 426 reporting the operator score on a periodic basis to at least one of the operator or a supervisor. The operator score may be reported after each shift, or weekly, monthly, together with paychecks, etc. According to an aspect, the operator score may include at least one of a metric of overall performance, areas of improvement, areas for further improvement, and areas of new skills. According to a further aspect, operator scores may be presented in relationship to the scores of other operators, so an operator can determine how their actions compare to their peers. Furthermore, operator scores may be used as part of a gamification, where operators may be rewarded or recognized for having relatively good scores on one or more of the categories.

The third method 400 may also include 428 developing a training plan tailored to the operator based on the operator behavior over a period of time as compared against predetermined metrics.

The third method 400 may also include 430 improving at least one of the model formula 104 or the value of the model parameter 100 by comparing computed state value 106 of the physical system 24 to a measured value of an operational parameter 52 associated therewith, and by adjusting at least one of the model formula 104 or the value of the model parameter 100 such that the computed state value 106 of the physical system 24 more accurately matches the measured value of the operational parameter 52 associated therewith. This step is similar to method step 214 detailed above and may be accomplished using the same steps and sub-steps as are described above with relation to that step.

The third method 400 may also include 432 generating an operator record for a given operator as a resume of qualifications and capability on a given type of vehicle 22, including level of experience and associated scores. The operator record may be used in evaluating the operator, in promoting responsible and efficient operation of vehicles 22.

The third method 400 may also include 434 generating an enterprise record for an organization having a plurality of operators including levels of experience and associated scores of the plurality of operators. The enterprise record may be used for promoting an enterprise's expertise, compliance with regulations such as safety training regulations, or for other purposes such as insurance underwriting, or for setting rental rates for vehicles 22.

A fourth method 500 for training a trainee to operate a vehicle 22 is also provided. The fourth method 500 includes 502 monitoring by a supervisory controller 44 located on the vehicle 22, values of a plurality of operational parameters 52 related to a physical system 24 of the vehicle 22. The operational parameters 52 include control inputs to the vehicle 22 by the trainee such as, for example, throttle, brake, and steering positions.

The fourth method 500 also includes 504 recording by a first processor 46 of the supervisory controller 44, the values of the plurality of operational parameters 52 in a working area 54 of a first computer readable storage media 48 of the supervisory controller 44, with a subset of the plurality of operational parameters 52 being designated as associated operational parameters 52 which are associated with a maneuver of the vehicle 22.

The fourth method 500 also includes 506 transmitting by the supervisory controller 44, the values of the associated operational parameters 52 to a server 56 located remotely from the vehicle 22 using a first communications channel 66.

The fourth method 500 also includes 508 providing a user interface device 68 for providing directions to the trainee while operating the vehicle 22.

The fourth method 500 includes 510 transmitting by the server 56, a training instruction 118 including directions on performing a maneuver of the vehicle 22 using the control inputs, to the user interface device 68 using a second communications channel 72.

The fourth method 500 includes 512 providing the training instruction 118 to the trainee by the user interface device 68.

The fourth method 500 includes 514 determining, by the server 56, a successful completion of training instruction 118 by at least one of the supervisory controller 44 or the server 56, by comparing the associated operational parameters 52 to a predetermined passing criterion.

The fourth method 500 also includes 516 providing a subsequent training instruction 118 to the trainee after the successful completion of the training instruction 118.

The fourth method 500 also includes 518 determining, by the server 56, an unsuccessful attempt to complete the training instruction 118 by the supervisory controller 44 by comparing the associated operational parameters 52 to an instruction failure criteria, and wherein the instruction failure criteria includes the passage of a timeout period of time after providing the training instruction 118 and without successful completion of the training instruction 118.

The fourth method 500 may also include 520 providing a remedial instruction by the user interface device 68 in response 34 to an unsuccessful attempt to complete the training instruction 118. The remedial instruction may include, for example, a more detailed explanation of how to perform the maneuver.

The fourth method 500 also includes 522 concluding the training with a passing grade after successful completion of a training program 120 including a plurality of the training instructions 118.

The fourth method 500 also includes 524 concluding the training with a failing grade in response 34 to the occurrence of a training failure criterion. The training failure criteria may include, for example, the passing of a predetermined amount of time before successful completion (i.e. a timeout failure); insufficient number of successful training instructions 118 (e.g. failing score); too many attempts to complete any given training instruction 118, or too many total attempts to complete the whole training program 120.

According to an aspect, the training program 120 may include repeating each of the plurality of the training instructions 118 3 to 5 times. Each of the steps may be repeated successively, or they may be repeated in another order. For example, a first step may be repeated three times before proceeding to a second. Alternatively, the first and second steps may be alternated.

The user interface device 68 may include one of a smartphone or a tablet such as an iPad or a device running the Android operating system. The user interface may include a personal computer or laptop, netbook, and/or may include a custom hardware configuration such as a touch screen, keyboard, mouse, trackpad, or other input and output devices. According to an aspect, the user interface device 68 may include a graphical user interface (GUI). With a GUI interface, the training instructions 118 may include graphic representations, showing how to use the control inputs to the vehicle 22 to perform the maneuver. According to another aspect, the user interface device 68 may include an audio interface such as a speaker or an audio output for playback of audio by another device such as an in-vehicle audio system. With an audio interface, the training instructions 118 may include voice prompts.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Obviously, many modifications and variations of the present invention are possible in light of the above teachings and may be practiced otherwise than as specifically described while within the scope of the appended claims.

What is claimed is:

1. A distributed system for monitoring and control of a vehicle comprising:
   a plurality of physical systems within the vehicle, and each including a plurality of components;
   a plurality of sensors, each measuring one or more physical properties on the vehicle;
   a plurality of subsystems within the vehicle each having one of said sensors providing a feedback signal to a control module;
   said control module providing a command signal to an actuator;
   a supervisory controller located in the vehicle and including a first processor and a first computer readable storage media and in communication with said sensors and said actuators; wherein the first computer readable storage media comprises a working area that is configured to store a plurality of operational parameters each having an associated numeric value, wherein the plurality of operational parameters comprise at least one out of (a) a process variable representing a physical property of one of the plurality of physical systems, (b) a control variable representing the command signal sent to the actuator, (c) data regarding an operator of the vehicle, and (d) one or more environmental factors experienced by the vehicle;
   a server located remotely from the vehicle and including a second processor and a second computer readable storage media and in regular communications with said supervisory controller;
   wherein said server is in regular communications with a plurality of other vehicles each including at least one system similar or identical to one of said physical systems;
   a communications module in communication with said supervisory controller for communicating with said server via a first external network and using a first communications channel;
   a database located in at least one of said first computer readable storage media or said second computer readable storage media and storing historical data including values of said plurality of operational parameters from different times; the
   an estimator module configured to estimate a transfer function based upon said historical data and characterizing said response in relation to a function input;
   wherein said function input is an operational parameter; and
   a comparison module configured to compare said transfer function of a subsystem against a plurality of reference functions corresponding to subsystems having known good, bad, or degraded conditions, and for characterizing said subsystem relative to those subsystems having known good, bad, or degraded conditions.

2. The distributed system for monitoring and control of a vehicle as set forth in claim 1, further including a prediction module configured to determine a degradation trend of the subsystem by comparing said transfer function to one or more of said reference functions and to predict a point of failure of said subsystem by extrapolating said degradation trend to a point of failure.

3. The distributed system for monitoring and control of a vehicle as set forth in claim 1, further including a user signaling device including one of an audio signaling device or a visual signaling device for providing a corresponding signal to a driver of the vehicle.

4. The distributed system for monitoring and control of a vehicle as set forth in claim 1, further including an intra-vehicle network communicating said operational parameters from one of said control modules to said supervisory controller.

5. A first method for monitoring of a vehicle including:
   monitoring by a supervisory controller located in the vehicle, values of a plurality of operational parameters related to a physical system of the vehicle;
   recording by a first processor of the supervisory controller, the values of the plurality of operational parameters in a working area of a first computer readable storage media of the supervisory controller; wherein the plurality of operational parameters comprises at least one out of (a) a process variable representing a physical property of one of the plurality of physical systems, (b) a control variable representing the command signal sent to the actuator, (c) data regarding an operator of the vehicle, and (d) one or more environmental factors experienced by the vehicle;
   storing historical data in a database located in at least one of the first computer readable storage media or a second computer readable storage media of a server located remotely from the vehicle, with the historical data including the values of the plurality of operational parameters recorded at different times;
   providing a functional model to simulate the physical system within the vehicle, including a model parameter and a plurality of operational parameters, and a model formula for calculating a computed state value using the model parameter and the plurality of operational parameters;
   storing the model parameter and the model formula in a model store area of memory within the first computer readable storage media of the supervisory controller;
   computing a computed state value of the physical system by at least one of the supervisory controller or the server, using the model formula and the model parameter and at least one of the operational parameters of the physical system; and
   improving at least one of the model formula or the value of the model parameter by comparing the computed state value to a measured value of an operational parameter associated therewith, and by adjusting at least one of the model formula or the value of the model parameter such that the computed state value of the physical system more accurately matches the measured value of the operational parameter associated therewith.

6. The first method for monitoring and control of a vehicle as set forth in claim 5 wherein the step of improving at least one of the model formula or the value of the model parameter includes:
   simulating by one of the supervisory controller or the server, the functional model using a plurality of different values for the model parameter and using the historical data to determine an updated value that is substantially better than the value of the model parameter at accurately matching the associated measured value of the operational parameter associated therewith; and
   replacing the model parameter with the updated value.

7. The first method for monitoring and control of a vehicle as set forth in claim 5 wherein the step of improving at least one of the model formula or the value of the model parameter includes:
- characterizing by one of the supervisory controller or the server, the associated measured value of the operational parameter associated with the functional model using a plurality of different operational parameters based upon the historical data to determine an updated formula that is substantially better than the model formula at determining the associated measured value of the operational parameter associated with the functional model; and
- replacing the model formula with the updated formula.

8. The first method for monitoring and control of a vehicle as set forth in claim 5 wherein the physical system is a hydraulic system; and
- wherein the operational parameters include at least one of: hydraulic system power, pump and motor torque, pump and motor flow, ram position, ram movement, oil temperature, oil filter delta-P, accumulator capacity, regulator valve function, solenoid valve function, PWM solenoid valve function, closed-loop system pressure, open loop system pressure, oil reservoir level, pump/motor displacement, charge pump pressure, or maintenance activity associated with the hydraulic system.

9. The first method for monitoring and control of a vehicle as set forth in claim 8, and further comprising:
- optimizing the operation of the hydraulic system by at least one of: operating the hydraulic system in a high efficiency mode using control outputs determined based on observed efficiency maps relating system efficiency to pump speed and system pressure, or operating the hydraulic system in a known low-wear rate mode based on wear-out behavior of known similar hydraulic systems.

10. The first method for monitoring and control of a vehicle as set forth in claim 5 wherein the physical system is an internal combustion engine; and
- wherein the operational parameters include at least one of: engine speed, engine load, coolant temperature, oil temperature, fuel flow, air filter delta-P, or maintenance activity associated with the internal combustion engine.

11. The first method for monitoring and control of a vehicle as set forth in claim 10, and further comprising:
- optimizing the operation of the physical system by at least one of: operating the physical system in a high efficiency mode using observed BSFC maps, or operating the physical system in a known low-wear rate mode based on wear-out behavior of known similar physical systems.

12. The first method for monitoring and control of a vehicle as set forth in claim 5 wherein the physical system is a battery module; and
- wherein the operational parameters include at least one of: battery current, battery voltage, battery temperature, battery state of charge, or maintenance activity associated with the battery module.

13. The first method for monitoring and control of a vehicle as set forth in claim 12, and further comprising:
- optimizing the operation of the battery module based on current system state of the physical system and historical data associated with the battery module.

14. The first method for monitoring and control of a vehicle as set forth in claim 13, further comprising:
- notifying operators or maintenance personnel of the optimization process.

15. The first method for monitoring and control of a vehicle as set forth in claim 13, wherein the step of optimizing the operation of the battery module further comprises at least one of:
- limiting a state of charge of the battery module to a value less than a full capacity during a break-in period of a given number of charge and discharge cycles; or
- resting the battery module at regular service intervals for a predetermined resting period of time while maintaining the battery voltage at a predetermined float voltage.

16. The first method for monitoring and control of a vehicle as set forth in claim 5, and further comprising:
- identifying components of the physical system to the supervisory controller by manually entering identifying information to an input device in communication with the supervisory controller.

17. The first method for monitoring and control of a vehicle as set forth in claim 5, and further comprising:
- identifying components of the physical system to the supervisory controller by communicating identifying information from a control module associated with the physical system to the supervisory controller via an intra-vehicle network.

18. The first method for monitoring and control of a vehicle as set forth in claim 5, and further comprising:
- detecting statistically significant changes in the physical system by monitoring the operational parameters associated with the physical system; and
- notifying at least one of the operator of the vehicle or maintenance personnel of a detected statistically significant changes in the physical system.

19. The first method for monitoring and control of a vehicle as set forth in claim 5, wherein the step of detecting statistically significant changes in the physical system includes comparing one of the operational parameters associated with the physical system against a predetermined threshold value.

20. The first method for monitoring and control of a vehicle as set forth in claim 5, wherein the step of detecting statistically significant changes in the physical system includes using a statistical process control method to detect one of the operational parameters that is either uncharacteristic of normal operation or that is characteristic of a known adverse condition.

21. The first method for monitoring and control of a vehicle as set forth in claim 5, further comprising:
- detecting operational parameters of the physical system that are indicative of aggressive operation or abuse by the operator of the vehicle; and
- notifying interested parties including least one of the operator of the vehicle or maintenance personnel or management personnel of detected operational parameters of the physical system that are indicative of aggressive operation or abuse by the operator of the vehicle.

22. The first method for monitoring and control of a vehicle as set forth in claim 5, further comprising:
- detecting operational parameters of the physical system that are indicative of a required maintenance item associated with the physical system; and
- notifying interested parties including least one of the operator of the vehicle or maintenance personnel of the required maintenance item.

* * * * *